（12）United States Patent
Cosman et al.

(10) Patent No.: US 12,052,315 B2
(45) Date of Patent: *Jul. 30, 2024

(54) USER BEHAVIOR MODEL DEVELOPMENT WITH PRIVATE FEDERATED LEARNING

(71) Applicant: Apple Inc., Cupertino, CA (US)

(72) Inventors: Stephen Cosman, San Jose, CA (US); Kalu Onuka Kalu, Los Gatos, CA (US); Marcelo Lotif Araujo, Campbell, CA (US); Michael Chatzidakis, Mountain View, CA (US); Thi Hai Van Do, Santa Clara, CA (US); Alexis Hugo Louis Durocher, San Francisco, CA (US); Guillaume Tartavel, Cupertino, CA (US); Sowmya Gopalan, Santa Clara, CA (US); Vignesh Jagadeesh, Cupertino, CA (US); Abhishek Bhowmick, Sunnyvale, CA (US); John Duchi, Menlo Park, CA (US); Julien Freudiger, San Francisco, CA (US); Gaurav Kapoor, Santa Clara, CA (US); Ryan M. Rogers, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 681 days.

This patent is subject to a terminal disclaimer.

(21) Appl. No.: 17/129,579

(22) Filed: Dec. 21, 2020

(65) Prior Publication Data
US 2021/0192078 A1 Jun. 24, 2021

Related U.S. Application Data

(60) Provisional application No. 63/041,975, filed on Jun. 21, 2020, provisional application No. 62/953,073, filed on Dec. 23, 2019.

(51) Int. Cl.
H04L 67/1097 (2022.01)
G06F 16/2457 (2019.01)
(Continued)

(52) U.S. Cl.
CPC .... H04L 67/1097 (2013.01); G06F 16/24578 (2019.01); G06F 16/438 (2019.01);
(Continued)

(58) Field of Classification Search
CPC ... H04L 67/1097; H04L 67/34; H04L 67/535; H04L 67/02; H04L 67/306;
(Continued)

(56) References Cited

U.S. PATENT DOCUMENTS 8,718,386 B2   5/2014  Das et al.
9,137,574 B2   9/2015  Rae et al.
(Continued)

Primary Examiner — Mohammad W Reza
(74) Attorney, Agent, or Firm — Blank Rome LLP

(57) ABSTRACT

Embodiments described herein provide for a non-transitory machine-readable medium storing instructions to cause one or more processors to receive, at a client device, a machine learning model from a server, detect a usage pattern for a content item, store an association between the content item and the detected usage pattern in local data, train the machine learning model using local data for the content item with the detected usage pattern to generate a trained machine learning model, generate an update for the machine learning model, privatize the update for the machine learning model, and transmit the privatized update for the machine learning model to the server.

19 Claims, 13 Drawing Sheets

(51) Int. Cl.
   *G06F 16/438*  (2019.01)
   *G06F 16/44*   (2019.01)
   *G06F 18/214*  (2023.01)
   *G06F 21/62*   (2013.01)
   *G06N 3/063*   (2023.01)
   *G06N 20/00*   (2019.01)
   *G06V 10/774*  (2022.01)
   *G06V 10/82*   (2022.01)
   *H04L 67/00*   (2022.01)

(52) U.S. Cl.
   CPC ........ *G06F 16/447* (2019.01); *G06F 18/2148* (2023.01); *G06F 21/6254* (2013.01); *G06N 3/063* (2013.01); *G06N 20/00* (2019.01); *G06V 10/7747* (2022.01); *G06V 10/82* (2022.01); *H04L 67/34* (2013.01)

(58) Field of Classification Search
   CPC ............ G06F 16/24578; G06F 16/438; G06F 16/447; G06F 18/2148; G06F 21/6254; G06F 21/6245; G06N 3/063; G06N 20/00; G06N 3/08; G06V 10/7747; G06V 10/82
   See application file for complete search history.

(56) References Cited

U.S. PATENT DOCUMENTS

| | | |
|---|---|---|
| 9,609,057 B2 | 3/2017 | Bicakci |
| 9,756,370 B2 | 9/2017 | Gopalan |
| 10,896,679 B1 | 1/2021 | Hu |
| 10,922,627 B2 | 2/2021 | Musuvathi |
| 10,990,850 B1 | 4/2021 | Chen |
| 11,108,575 B2 | 8/2021 | Kasaragod |
| 11,341,429 B1 * | 5/2022 | Pihur ............... G06N 5/04 |
| 2005/0046584 A1 | 3/2005 | Breed |
| 2005/0116954 A1 | 6/2005 | Ripps |
| 2007/0008321 A1 | 1/2007 | Gallagher |
| 2009/0172030 A1 | 7/2009 | Schiff |
| 2010/0228768 A1 | 9/2010 | Yamasuge |
| 2011/0214147 A1 | 9/2011 | Kashyap |
| 2012/0023043 A1 | 1/2012 | Cetin et al. |
| 2012/0023226 A1 | 1/2012 | Petersen |
| 2014/0280476 A1 | 9/2014 | Chiussi |
| 2014/0357312 A1 | 12/2014 | Davis |
| 2015/0286873 A1 | 10/2015 | Davis |
| 2017/0055127 A1 | 2/2017 | Sayed |
| 2018/0101776 A1 | 4/2018 | Osotio |
| 2018/0268283 A1 | 9/2018 | Gilad-Bachrach et al. |
| 2018/0365580 A1 | 12/2018 | Musuvathi et al. |
| 2019/0227980 A1 * | 7/2019 | McMahan ............ G06N 3/044 |
| 2019/0334907 A1 | 10/2019 | Rodden |
| 2020/0278738 A1 | 9/2020 | Madar, III |
| 2020/0364233 A1 * | 11/2020 | Chan ............... G06F 16/24578 |
| 2021/0073678 A1 * | 3/2021 | Chu ................ G06N 3/09 |
| 2021/0174448 A1 * | 6/2021 | Kotarinos ........... G06Q 40/04 |

* cited by examiner

USER BEHAVIOR MODEL DEVELOPMENT WITH PRIVATE FEDERATED LEARNING

RELATED APPLICATIONS

This application claims the benefit of U.S. Provisional Patent Application No. 62/953,073 entitled "USER BEHAVIOR MODEL DEVELOPMENT WITH PRIVATE FEDERATED LEARNING," to Stephen Cosman, filed Dec. 23, 2019 and U.S. Provisional Patent Application No. 63/041,975 entitled "USER BEHAVIOR MODEL DEVELOPMENT WITH PRIVATE FEDERATED LEARNING AND TIMELINE GENERATION," to Stephen Cosman, filed Jun. 21, 2020, and both of which are incorporated by reference in their entirety to the extent that it is consistent with this disclosure.

FIELD

Embodiments described herein relate generally to federated machine learning using distributed computing systems. More specifically, some embodiments relate to building a user behavior model using a private federated learning system with protections against reconstruction attacks.

BACKGROUND OF THE DESCRIPTION

The training of machine learning models for use in image classification, next word prediction, and other related tasks generally makes use of powerful hardware and a large amount of data. The large amount of training data can increase the accuracy of the trained models. The more powerful the hardware, the faster the training operations can be performed. Previously, the training of machine learning models required dedicated, high-performance compute nodes. However, modern mobile electronic devices are now able to perform on-device training, even for large complex machine learning models. Training data can be divided and distributed to a large number of mobile electronic devices, which can each perform on-device training of the model using a subset of the training data. However, the training data that is used on each mobile device is generally a small fraction of the full dataset.

Computing a shared model that leverages the full dataset would significantly outperform each of the individual models trained on its own dataset. Shared models can then be deployed to each device to benefit all users for a variety of tasks, which can improve the overall user experience. One way to compute a shared model in this distributed setting is to directly transmit data from each device to a central server where training can be done. However, the data on each device is sensitive by nature and transmitting user data to a centralized server can compromise the privacy of user data.

SUMMARY OF THE DESCRIPTION

Various embodiments of a machine learning systems will be described herein. Other features and advantages will be apparent from the accompanying drawings and from the detailed description.

An embodiment described herein provides for a non-transitory machine-readable medium that stores instructions to cause one or more processors of a data processing system to perform operations. The instructions cause the one or more processors to receive, at a client device, a machine learning model from a server, detect a usage pattern for a content item, the detected usage pattern comprising at least one interaction in relation to the content item, store an association between the content item and the detected usage pattern in local data, the local data comprising at least one association between the content item and a content item feature, train, at the client device, the machine learning model using local data for the content item with the detected usage pattern to generate a trained machine learning model, the trained machine learning model to identify a predicted content item with one or more identified content item features for a desired usage pattern, generate an update for the machine learning model, the update that represents a difference between the machine learning model and the trained machine learning model, privatize the update for the machine learning model, and transmit the privatized update for the machine learning model to the server.

An embodiment described herein provides for a non-transitory machine-readable medium that stores instructions that cause one or more processors of a data processing system to perform operations. The instructions that cause the one or more processors to receive, at a client device, an updated machine learning model from a server, the updated machine learning model comprising aggregated privatized model updates from one or more device groups of client devices, analyze local content item data with the received updated machine learning model, the local content item data comprising at least one of an association between the content item and a plurality of content item features or an association between the content item and one or more locally stored usage patterns, receive a set of predicted content item setting items based on analysis performed by the updated machine learning model with the local content item data, and present the set of predicted content item setting items in a user interface on the client device.

An embodiment described herein provides for a data processing system comprising a memory to store instructions and one or more processors to execute the instructions. The instructions cause the one or more processors to receive, at a client device, a machine learning model from a server, detect a usage pattern for a content item, the detected usage pattern comprising at least one interaction in relation to the content item, store an association between the content item and the detected usage pattern in local data, the local data comprising at least one association between the content item and a content item feature, train, at the client device, the machine learning model using local data for the content item with the detected usage pattern to generate a trained machine learning model, the trained machine learning model to identify a predicted content item with one or more identified content item features for a desired usage pattern, generate an update for the machine learning model, the update that represents a difference between the machine learning model and the trained machine learning model, privatize the update for the machine learning model, and transmit the privatized update for the machine learning model to the server.

An embodiment described herein provides for a data processing system comprising a memory to store instructions and one or more processors to execute the instructions. The instructions that cause the one or more processors to receive, at a client device, an updated machine learning model from a server, the updated machine learning model comprising aggregated privatized model updates from one or more device groups of client devices, analyze local content item data with the received updated machine learning model, the local content item data comprising at least one of an association between the content item and a plurality of content item features or an association between the content item and one or more locally stored usage patterns, receive a set of predicted content item setting items based on analysis performed by the updated machine learning model with the local content item data, and present the set of predicted content item setting items in a user interface on the client device.

An embodiment described herein provides for a method that receives, at a client device, a machine learning model from a server, detects a usage pattern for a content item, the detected usage pattern comprising at least one interaction in relation to the content item, stores an association between the content item and the detected usage pattern in local data, the local data comprising at least one association between the content item and a content item feature, trains, at the client device, the machine learning model using local data for the content item with the detected usage pattern to generate a trained machine learning model, the trained machine learning model to identify a predicted content item with one or more identified content item features for a desired usage pattern, generate an update for the machine learning model, the update that represents a difference between the machine learning model and the trained machine learning model, privatize the update for the machine learning model, and transmit the privatized update for the machine learning model to the server.

An embodiment described herein provides for a method that detects a usage pattern for a content item, the detected usage pattern comprising at least one interaction in relation to the content item, stores an association between the content item and the detected usage pattern in local data, the local data comprising at least one association between the content item and a content item feature, train, at the client device, the machine learning model using local data for the content item with the detected usage pattern to generate a trained machine learning model, the trained machine learning model to identify a predicted content item with one or more identified content item features for a desired usage pattern, generates an update for the machine learning model, the update that represents a difference between the machine learning model and the trained machine learning model, privatizes the update for the machine learning model, and transmits the privatized update for the machine learning model to the server.

In some embodiments, the association comprises annotating the content item with the usage pattern. In an embodiment, the desired usage pattern is a hard-coded set of interactions with the content item. In an embodiment, the desired usage pattern is a learned sequence of interactions from local interaction data. In an embodiment, the desired usage pattern is a series of interactions prior to selection of a content item for a content item setting of an application. In some embodiments, the content item is an image. In some embodiments, the one or more identified content item features is a multimodal vector of features.

BRIEF DESCRIPTION OF THE DRAWINGS

Various embodiments and aspects of a machine learning system will be described herein, with reference to details discussed below. The described embodiments are illustrated by way of example and not limitation in the figures of the accompanying drawings, in which like references indicate similar elements, and in which.

DETAILED DESCRIPTION

Figure 1:
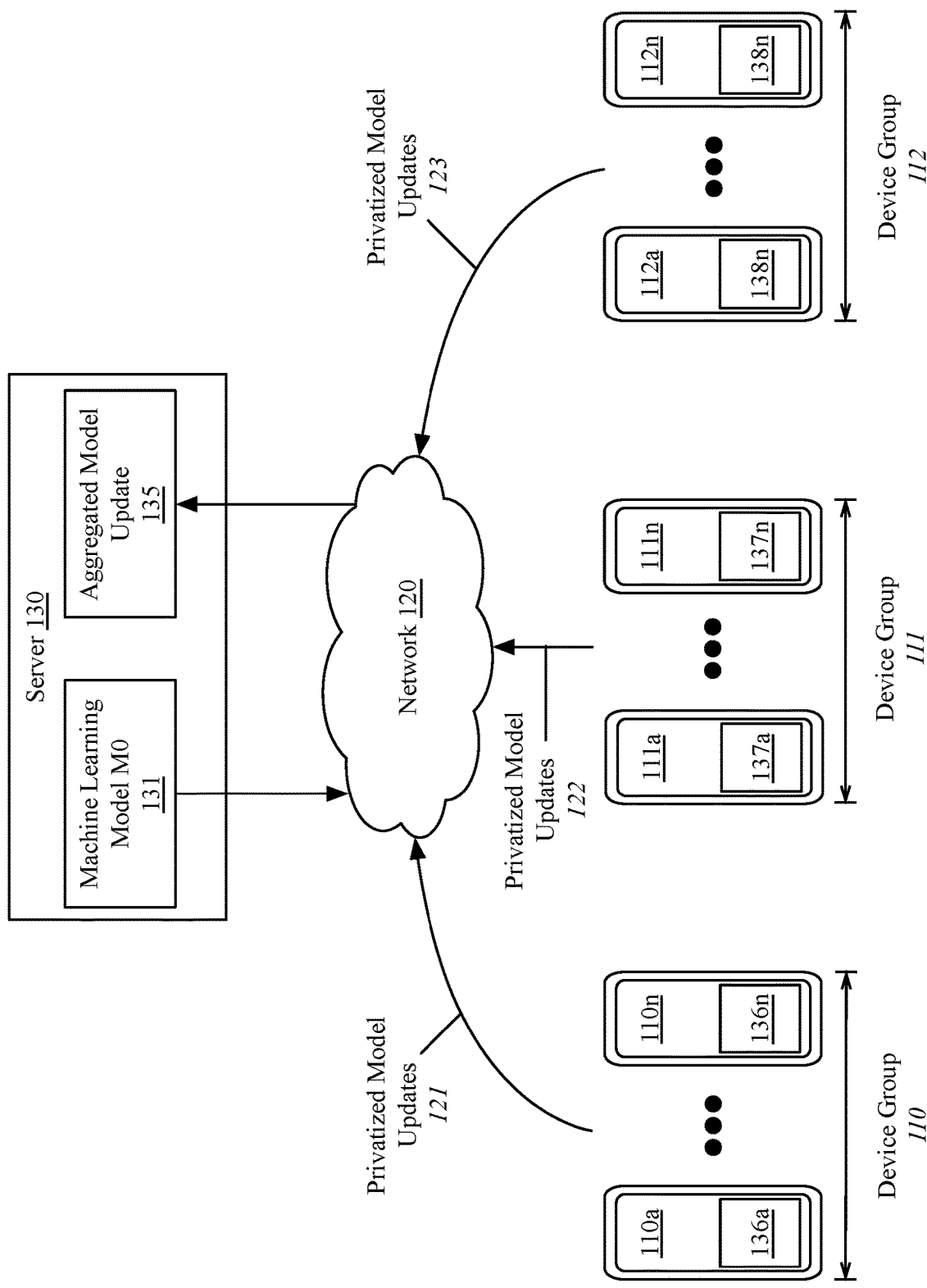
FIG. 1 illustrates a system to enable a user behavioral model, according to an embodiment.

Embodiments of the present invention may use machine learning techniques, such as private federated learning, to create or update a machine learning model to predict user behavior with items accessible with a device. In some embodiments, the resulting updated machine learning model predicts a desired usage pattern with a content item and/or an application accessible on a user device. In other embodiments, the machine learning model may predict one or more content items with features that the device user may select for a desired usage pattern. A usage pattern for a content item is a series of one or more interaction with a device in relation to access of a content item. Predicting a content item that a user may want for the desired usage pattern (e.g., selection of a content item within a user interface, selection of a content item to be rendered during a period of time, etc.) is the goal of the resulting updated machine learning model M1 235.

The interaction may be detected by input to a device, any number of sensors on the device, and/or an input received by an operating system or an application executing on the device. The content item may be an image, a video, text content, audio content, streamed content, live data, sensor data, and/or any other media item type. The application may be one or more programs accessible for use on the device, such as installed on the device or offered as a service of the device. For example, the machine learning model may predict a set of images that the user may want to choose between within a user interface, such as for a screen saver, a background image, a profile image, an avatar, a cover photo for a set of photos, a favorite image, an image to share with a communication application, an image for an icon, an image to represent a home or area of the home in a home application, etc. Continuing with the example, the machine learning model may be trained to identify a set of images accessible on the user device that have features learned to be associated with images selected for the desired usage pattern of selecting an image for a content item setting (e.g., an image for a screen saver, an image for a background, an icon image, a profile photo for an account, a recording for a screen saver, etc.) with an application (e.g., a standard application, SpringBoard, windows server, a home application, a communication application, etc.) that manages a graphical user interface for the device.

In an embodiment, the machine learning model may perform timeline generation. Timeline generation is the prediction of a set of content items (e.g., images, etc.) that the user may want rendered on the device within a user interface of an application (e.g., a photos application) during a period of time. Continuing with the example, the machine learning model may be trained to identify or predict the set of content items (e.g., images, video, audio, etc.) accessible from the user device that have features learned to be associated with content items that are temporally and contextually relevant to the user during that the particular period of time. The content items may have features that are relevant to the particular period of time. By way of example, users may interact with photos related to family during the week at work and interact with photos related to vacations or particular locations during the weekend.

The features learned may be features and/or metadata associated with the content item and/or usage patterns related to the content item. In some embodiments, federated learning may be employed to learn a set of interactions and/or features associated with a content item prior to selection of the image by a sample of users for the image rendered in the user interface.

Federated learning, also referred to as distributed learning, focuses on learning problems when data is distributed across many devices. Let $\theta \in \Theta$ be model parameters for a particular model that is to be trained using user data. In federated learning, the model parameters $\theta$ are transmitted to each device and then each device trains a local model using its local data. The locally trained model on device i becomes $\theta_i$ and the difference between the starting model parameters and the locally trained parameters $\Delta_i = \theta_i - \theta$ are sent to a central server. A collection of b model differences $\{\Delta_1, \ldots, \Delta_b\}$ is then aggregated to obtain $\Delta$ on a central server which is then used to update the central model parameters $\theta \leftarrow \theta + \Delta$. The update to the shared model can then be deployed to the mobile devices. This feedback loop continues as the model improves and the user data changes.

Some approaches to federated learning, even when performing on-device training, does not provide any formal privacy guarantees to users that participate in the federated learning system. Even though data remains on device, the transmitted model updates are computed with user data and contain information about the personal data. A curious onlooker that has access to the model updates may be able to reconstruct data of individual users.

One approach for incorporating privacy into federated learning is to use differential privacy on the server, typically called the central model of differential privacy. Differential privacy has many nice properties, including closure under post-processing and the graceful degradation of privacy parameters if multiple differential privacy algorithms are composed together, that has made it the de facto privacy definition in data analytics and machine learning. However, an objection to differential privacy in the central model is that the users submit their data, perhaps through an encrypted channel, that is then decrypted on the server. Thus, the server is trusted to use a differential privacy algorithm with the data to only reveal a privatized result. An adversary with access to the server may be able to see the true model updates prior to any execution of a differential privacy algorithm.

Another approach to protecting the individual updates is to use secure multiparty computation (SMC). However, with SMC, the communication cost of a user scales with the number of users that are selected to submit updates. In this setting, it is assumed that users remain online for multiple rounds of communication, which may be unrealistic in practical settings. Further, the on-device computational difficulty scales linearly with the dimension of the model and the number of users contributing updates, which may be prohibitively expensive. An optimal approach would ensure privacy with minimal impact to computation cost on device and communication cost between the devices and the server.

Local privacy protections provide numerous benefits including avoiding risks associated to maintaining private data. Additionally, local privacy protections allow transparent protection of user privacy, as private data never leaves an individual's device in the clear. However, local differential privacy can create challenges for learning systems.

Embodiments described herein address the above deficiencies in the art by providing a private federated learning system that privatizes model updates submitted by users via a separated differential privacy model with protections against adversaries with some prior information about user updates. Separated differential privacy involves decomposing the weight vector that includes updates to a learning model into a unit vector and an associated magnitude. The decomposed vectors can then be separately privatized using techniques described herein. Separated differential privacy enables privatized learning by implementing a privacy model that is tailored towards protecting against an attacker that may wish to decode individual user data based on model updates, rather than an attacker that wants to differentiate between two inputs. This approach allows the use of a more relaxed privacy parameter £, which improves the effectiveness of the learning process, while still providing protection against curious onlookers that may be able to obtain access to privatized model updates.

This model of privacy is well suited to federated learning scenarios that use distributed model training. Separated differential privacy enables learning models to be trained in a decentralized setting while providing local privacy guarantees for the transmitted model updates from the devices. Using separated differential privacy, a private federated learning system can be enabled that provides comparable utility to a federated learning system that does not provide privacy safeguards. Privacy is enabled by obfuscating the individual updates to the server. In one embodiment a relaxed privacy parameter $\varepsilon$ is used, user data is still protected against reconstruction by individuals (e.g., internal employees) that may have access to privatized updates. In one embodiment, fully $\varepsilon$-differentially-private techniques are used to enable privatization of the magnitude. In another embodiment, relative noise mechanisms are used to privatize the magnitude.

In addition to separated differential privacy, an additional layer of privacy is enabled by encapsulating the separated differential privacy model within a central differential privacy layer on the learning server. The use of central differential privacy provides additional protection for updated learning models on the server against external adversaries that may have access to the model and any other information except the user data that the adversary wishes to decode.

In the description and figures, numerous specific details are described to provide a thorough understanding of various embodiments. However, in certain instances, well-known or conventional details are not described to provide a concise discussion of embodiments. Additionally, reference herein to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order than illustrated.

FIG. 1 illustrates a system 100 to enable a user behavioral model developed with private federated learning, according to an embodiment. In one embodiment the system 100 includes a server 130 that can receive data from a set of client devices 110a-110n, 111a-111n, 112a-112n over a network 120. The server 130 can be any kind of server, including an individual server or a cluster of servers. The server 130 can also be or include a cloud-based server, application server, backend server, virtual server, or combination thereof. The network 120 can be any suitable type of wired or wireless network such as a local area network (LAN), a wide area network (WAN), or combination thereof. Each of the client devices can include any type of computing device such as a desktop computer, a laptop, a tablet computer, a smartphone, a television set top box, a smart speaker system, a gaming system, a wearable device, a head mounted display device, or other computing device. For example, a client device can be an iPhone®, Apple® Watch, Apple® TV, HomePod™, etc., and can be associated with a user within a large set of users to which tasks can be crowdsourced with the permission of the user.

In one embodiment, the server 130 stores a machine learning model 131 (e.g., model M0), which can be implemented using one or more neural networks, such as but not limited to a deep learning neural network. The machine learning model 131 can be implemented using, for example, a convolutional neural network (CNN) or a recurrent neural network (RNN), including a long short-term memory (LSTM) variant of an RNN. Other types of machine learning models and/or neural networks can be used. The machine learning model 131 can include a set of model weights that can be updated based on an aggregated model update 135 that is generated based on aggregated privatized model updates sent from the set of client devices 110a-110n, 111a-111n, 112a-112n.

The client devices can be organized into device groups (e.g., device group 110, device group 111, device group 112) that can each contain multiple client devices. Each device group can contain n devices, where n can be any number of devices. For example, device group 110 can contain client device 110a-110n. Device group 111 can contain client device 111a-111n. Device group 112 can contain client device 112a-112n. In one embodiment, each device group can contain up to 128 devices, although the number of client devices in each device group can vary across embodiments and is not limited to any specific number of devices.

In one embodiment, each of the client devices (client device 110a-110n, client device 111a-111n, client device 112a-112n) can include a local machine learning module. For example, client device 110a-110n of device group 110 can each contain corresponding local machine learning module 136a-136n. Client device 111a-111n of device group 111 can each contain corresponding local machine learning module 137a-137n. Client device 112a-112n of device group 112 can each contain a corresponding local machine learning module 138a-138n. In various embodiments, the local machine learning modules can be loaded on each client device during factory provisioning or can be loaded or updated when a system image of the client device is updated. In one embodiment, the machine learning model 131 of the server 130 can be transmitted to each local machine learning module over the network 120. The local machine learning models on the client devices can be individualized to each client device by training the local models using local data stored on the client device. In one embodiment, different types of data can be used to train the models, and the specifics of the models can vary based on the type of data that is used to train. In one embodiment, the machine learning model 131 and the local machine learning models are user behavioral models. For user behavior models, human interaction data with one or more devices is gathered and interpreted or analyzed to attempt to predict human behavior. In some embodiments, features of items that users interact with are analyzed to attempt to predict or make decisions about human behavior.

Some embodiments may associate predictions about human behavior with particular personas. Personas may represent a user type with particular goals, behavior, and/or characteristics. For example, the user type may be a person that interacts with content items that include a landscape. In another example, the user type may be a person that interacts with content items that include animals, such as a Bichon Frise breed of dog.

User behavior models may be used in conjunction with other models. In one embodiment, the models are natural language processing models that are used to enable a predictive keyboard and/or keyboard autocorrect. In one embodiment the models can be voice recognition or voice classification models that are used to improve voice recognition or voice classification capability for a virtual assistant. In other embodiments, the models are image classification models.

The local machine learning modules 136a-136n, 137a-137n, 138a-138n on each client device can generate model updates that are privatized by the client devices 110a-110n, 111a-111n, 112a-112n before transmission to the server 130. For example, client devices 110a-110n can each send privatized model updates 121, client devices 111a-111n can each send privatized model updates 122, and client devices 112a-112n can each send privatized model updates 123. The privatized model updates can be sent through the network 120 to the server 130, where the updates can be processed into an aggregated model update 135. Updates are sent to the server while satisfying separated differential privacy for the local updates and no raw data for users is transmitted to the server. Separated differential privacy is used to protect the privatized model updates 121, 122, 123 from a reconstruction breach. A reconstruction breach occurs when a curious onlooker having access to the model updates is able to determine at least some detail about the user data on which the model is trained.

Consider the models updates as being a high dimensional vector $W \in \mathbb{R}^d$, which is the difference between the original model weights and the model weights after training with the local data X The private federated learning system described herein is configured such that adversaries that can view the transmitted updates $M(W)=Z$ (where $M: \mathbb{R}^d \to \mathbb{Z}$ is some mechanism) cannot construct an estimator based on Z that can be close to W, or any target function $f$ of W within some tolerance $\alpha$.

Figure 2:
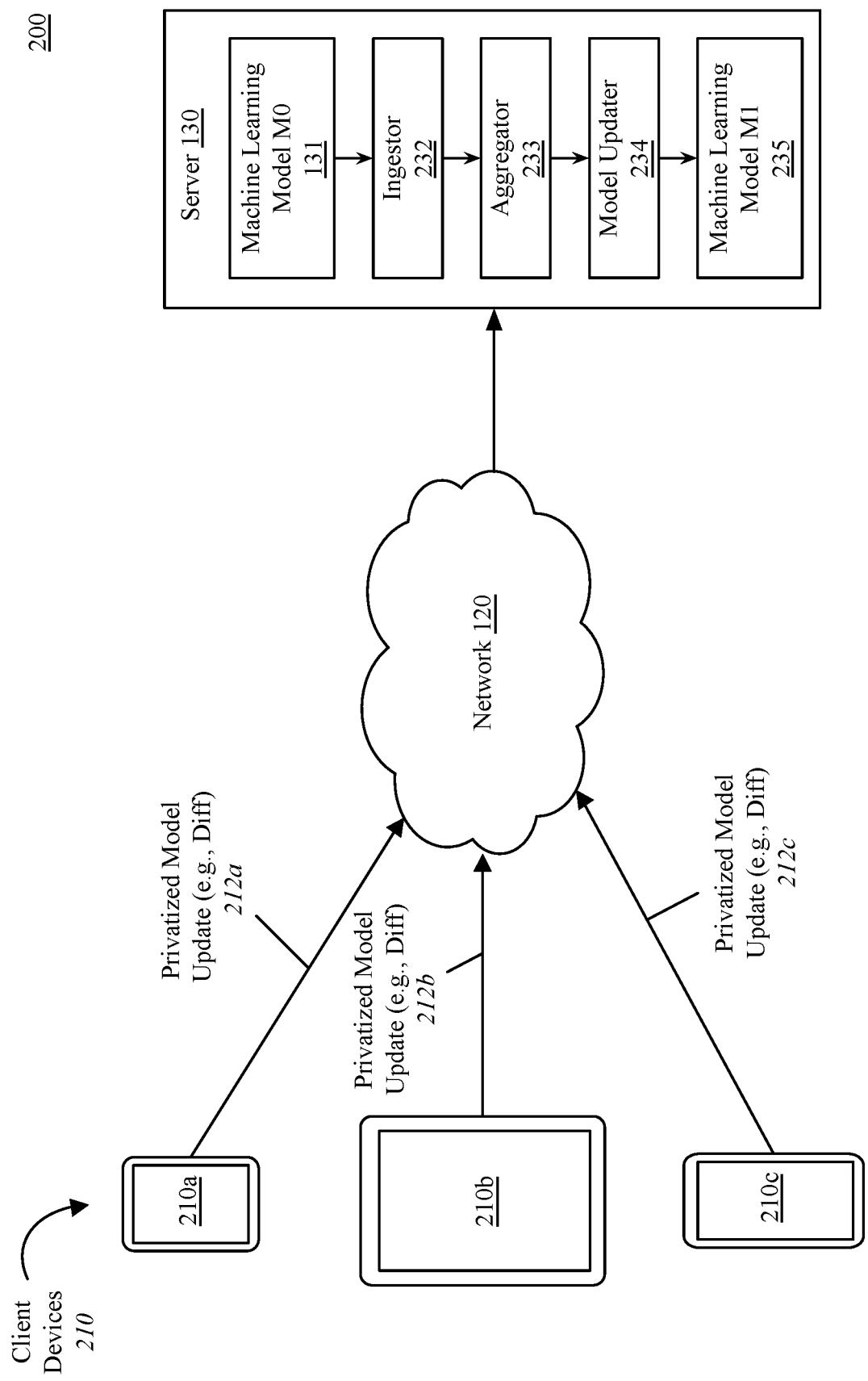
FIG. 2 illustrates an additional system to enable a user behavioral model, according to embodiments described herein.

FIG. 2 illustrates an additional system 200 to enable private federated learning, according to embodiments described herein. In one embodiment, the system 200 includes a set of client devices 210a-210c (collectively, 210), which can be any of the client devices described above (e.g., client devices 110a-110n, 111a-111n, 112a-112n). The client devices 210, using the techniques described above, can generate privatized model updates 212a-212c (e.g., privatized model update 212a from client device 210a, privatized model update 212b from client device 210b, privatized model update 212c from client device 210c), which can be transmitted to the server 130 via the network 120. The privatized model updates 212a-212c can be stripped of their IP addresses or other information that can be used to identify the client devices 210 prior to entering an ingestor 232 on the server 130. The ingestor 232 can collect the data from the client devices 210 and remove metadata and forwards the data to an aggregator 233. The aggregator takes the privatized model updates and aggregates them to form a single update to the current server model, which in the initial round is machine learning model 131 (e.g., model M0). A model updater 234 can then apply the updates to the current server model to generate an updated machine learning model M1 235 (e.g., model M1). The privatized model updates 212a-212c can be protected using separated differential privacy as described herein. The aggregated model updates and/or updated machine learning model 235 can be protected using the central model of differential privacy.

Figure 3A:
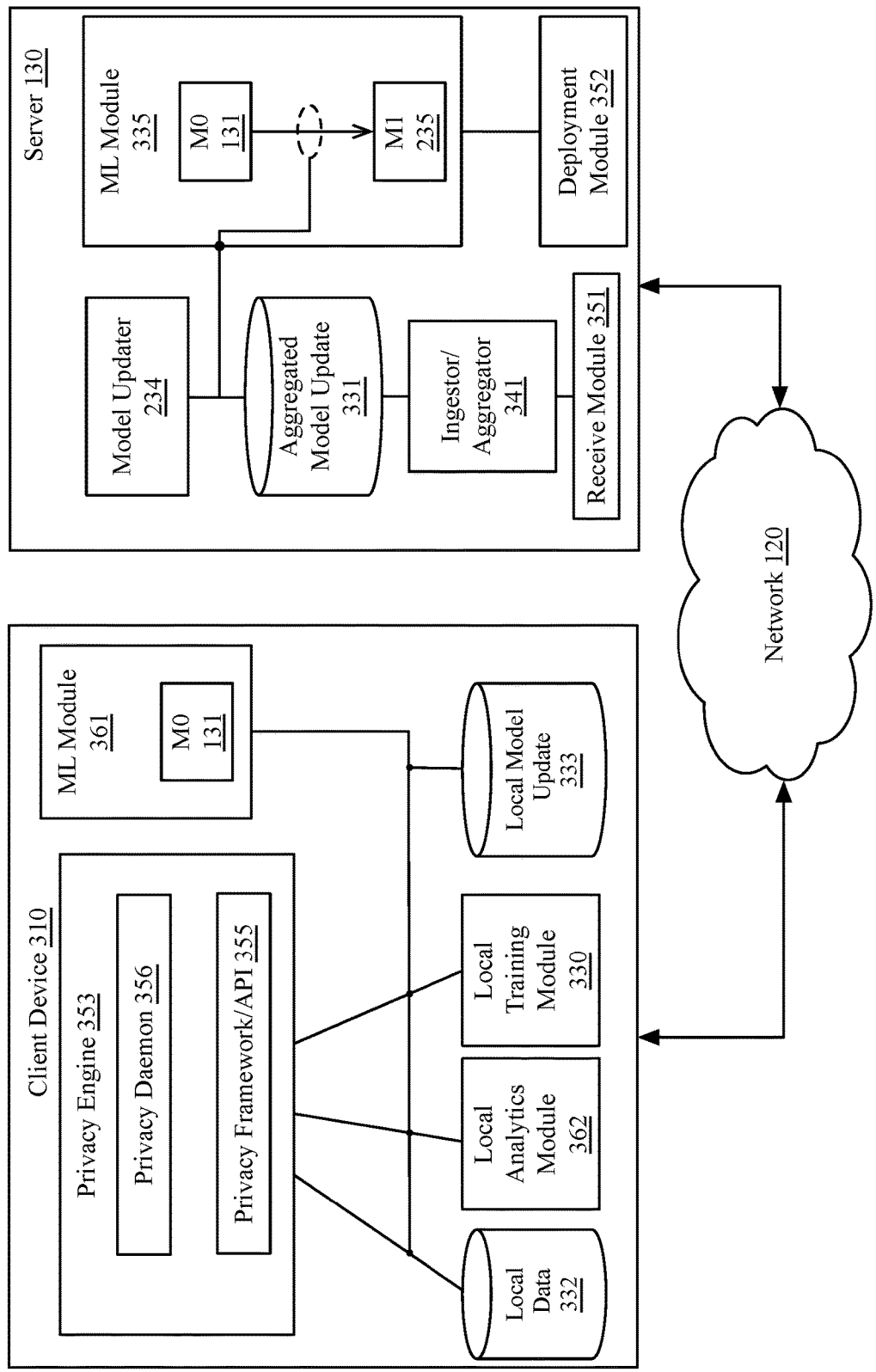
FIG. 3A is a block diagram of a system for generating privatizing model updates, according to an embodiment.

FIG. 3A is a block diagram of a system 300 for generating privatizing model updates, according to an embodiment. The system 300 includes a client device 310, which can be any of client devices 110a-110n, 111a-111n, 112a-112n or client devices 210. The client device 310 includes a machine learning module 361 that includes, at least initially, a copy of machine learning model 131, which can be provided by the server 130. A local training module 330 can be used to train the machine learning model 131 based on local client data 332 to generate a local model update 333. In some embodiments, the local analytics module 362 is used to analyze local data 332 to produce a user behavior model type of machine learning model. The local model update 333 is then privatized using a privacy engine 353. In one embodiment, the privacy engine 353 includes a privacy daemon 356 and a privacy framework or application programming interface (API) 355. The privacy engine 353 can use various tools, such as hash functions, including cryptographic hash functions, to privatize the local model update 333 to the machine learning model 131 using one or more of a variety of privatization techniques including but not limited to separated differential privacy as described herein. The privatized local model update 333 can then be transmitted to the server 130 via the network 120.

The server 130 can include a receive module 351 and an ingestor/aggregator 341. The receive module 351 can asynchronously receive privatized model updates from a large plurality of client devices and provide the updates to the ingestor/aggregator 341. The receive module 351 can remove latent identifiers such as IP addresses or other data that might identify the client device 310. The ingestor/aggregator can include components of the ingestor 232 and aggregator 233 shown in FIG. 2 and can perform similar operations, such as removing metadata, session identifiers, and other identifying information, and aggregating the privatized information to generate an aggregated model update 331. The aggregated model update 331 can be used by the model updater 234 to update machine learning model 131 (e.g., model M0) into updated machine learning model 235 (e.g., model M1). A deployment module 352 can then be used to deploy the updated machine learning model 235 to the client devices for an additional round of training. While the updated machine learning model 235 is on the server 130, the model can be protected using central differential privacy.

Figure 3B:
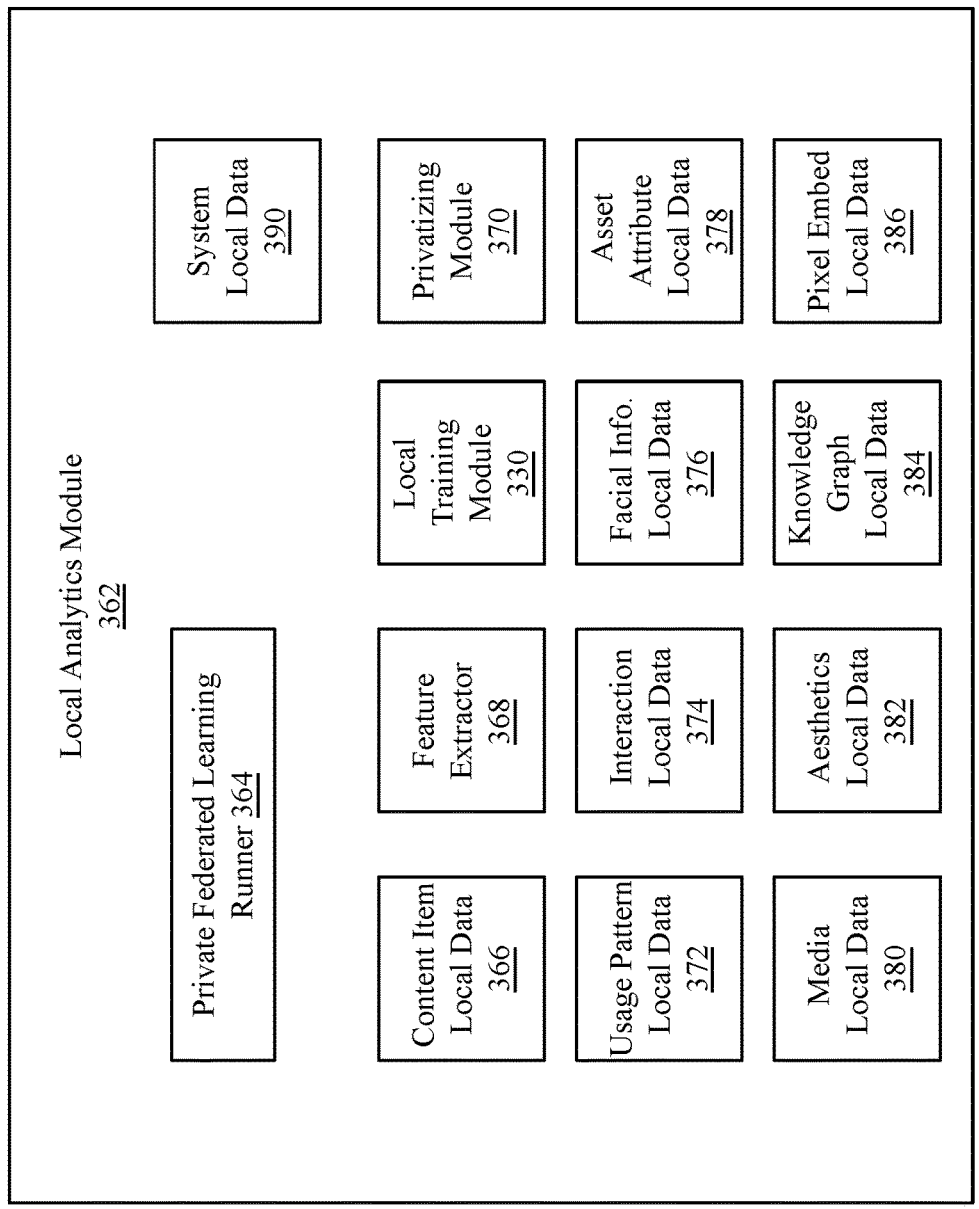
FIG. 3B is a block diagram of a system for generating privatizing model updates, according to an embodiment.

FIG. 3B is a block diagram of a system 301 for generating privatizing model updates, according to an embodiment. Local analytics module 362 provides an analysis service for updating machine learning model 131 (e.g., model M0) to become updated machine learning model 235 (e.g., model M1), such as a user behavioral model. A private federated learning runner 364 may control the flow of operations for creating or updating the machine learning model 131. Local data 332, such as content item local data 366, usage pattern local data 372, facial information local data 376, asset attribute local data 378, media local data 380, aesthetic information local data 382, knowledge graph local data 384, pixel embed local data 386, interaction local data 374, system data local data 390 and/or any other local data, may be gathered and stored in one or more databases. A database may be a relational database, a set of files, or any other structured set of data stored in a computer. Storage within the database may involve storage of an association between an identifier for one type of local data (e.g., content item identifier, usage pattern identifier, and interaction identifier) with an item or another type of local data identifier.

Facial information local data 376 may indicate information on one or more faces that are found in the content item, including, but not limited to the following: an eye state, a smile type, a size, a facial expression type, an age, a face capture quality score, and/or any other information related to a face in the content item. Asset attribute local data 378 may indicate an attribute, such as a property of the content item, including, but not limited to the following: a designation as a favorite, a duration of time for content item, an image aspect ratio, an asset type (e.g., screen recording), a resolution, a format, and any other asset attribute information for a content item. Media local data 380 may indicate information the quality of the media for the content item, including, but not limited to the following: an exposure, a level of blurriness, an indication as to whether blurriness was intentional, an activity score, an indication as to whether media type is taboo for the user, a face count, a condition or a setting for autoplay of content item, a video score, an indicator of location preference for content item (e.g., not safe for work designation), an audio classification, and/or any other media indicator for the content item. Aesthetics local data 382 may indicate aesthetic quality information on the content item, including, but not limited to the following: an aesthetic score, a subject matter score, a timed shot score, a color indicator (e.g., lively, harmonious, etc.), an immersive score, a noise indicator, a lighting indicator (e.g., low light, pleasing light, etc.), a blurring score, a reflection score, a symmetry score, a pleasant perspective score, an object presence score, a framing score, a focus score (e.g., sharpness), a pattern indication, a post processing score, a composition score, a camera tilt indication, and/or any other aesthetic information for the content item. Knowledge graph local data 384 may indicate metadata associated with the content item, including, but not limited to the following: location, person presence (e.g., contact presence, coworker presence, family member presence, partner presence, child presence, etc.), animal presence (e.g., pet, wildlife, etc.), category for content item (e.g., public event, business, scene type, home, work, etc.), period of time (e.g., taken on weekend, taken during summer, taken during a particular season or holiday, taken during week, etc.), an indication on return on investment, and any other knowledge graph information on the content item. Pixel embed local data 386 may indicate metadata associated with the content item, including, but not limited to the following: an image feature vector, and any other image classification metadata for the content item. System local data 390 may include any user or application data permitted to be used by the user for machine learning. System local data 390 may include information on a content item collection size, localization information, information on a persona, on device local information/data donated or otherwise provided by applications for machine learning (e.g., user calendar information, user contact's information, communication information, application use information, etc.), and/or any other information on the system and/or local user data.

The local user data 332 may be based on human interaction with the device or by virtue of the features of the elements that the user is interacting with on the user interface of the device. For example, a usage pattern of repeatedly accessing or sharing (e.g., emailing, sending in text message, etc.) a content item may be a desired usage pattern with a content item that the user behavioral model may want to replicate by predicting other content items with which the user may similarly interact with using the client device 310. Interaction local data 374 may include, but is not limited to, the following: play counts, share counts, view counts, access counts, and any other user interactions with the content item. Continuing with the example, the particular features of the content item stored in content item local data 366 for the content item may indicate what type of content item (e.g., a photo) the user may have a similar reaction to that would trigger the same usage pattern. By way of further example, the features may be metadata associated with the content item.

A feature extractor 368 may be used to gather local data 332, such as content item local data 366, usage pattern local data 372, interaction local data 374 and/or any other local data 332. The feature extractor 368 may provide a vector that represents multimodal features related to the content item. The set of multimodal features may come in the form of many types of modes for providing information, such as metadata on image, noise captured with a live image or video content, weather statistics for the day, application data, sensor data, and/or any other type of data. The feature extractor 368 may perform preprocessing in order to smooth feature fusion such that all information related to the content item is usable by the neural network. In some embodiments, the feature extractor 368 may have one or more preprocessing objects on the device that may be enabled (e.g., by a server, a client device, etc.) to preprocess a multimodal vector that representing the features. The local training module 330 may be used to train model 131 to create a resulting updated model M1 235. Next, the privatizing module 370 may be privatized as described in FIG. 4A, in some embodiments.

Figure 4A:
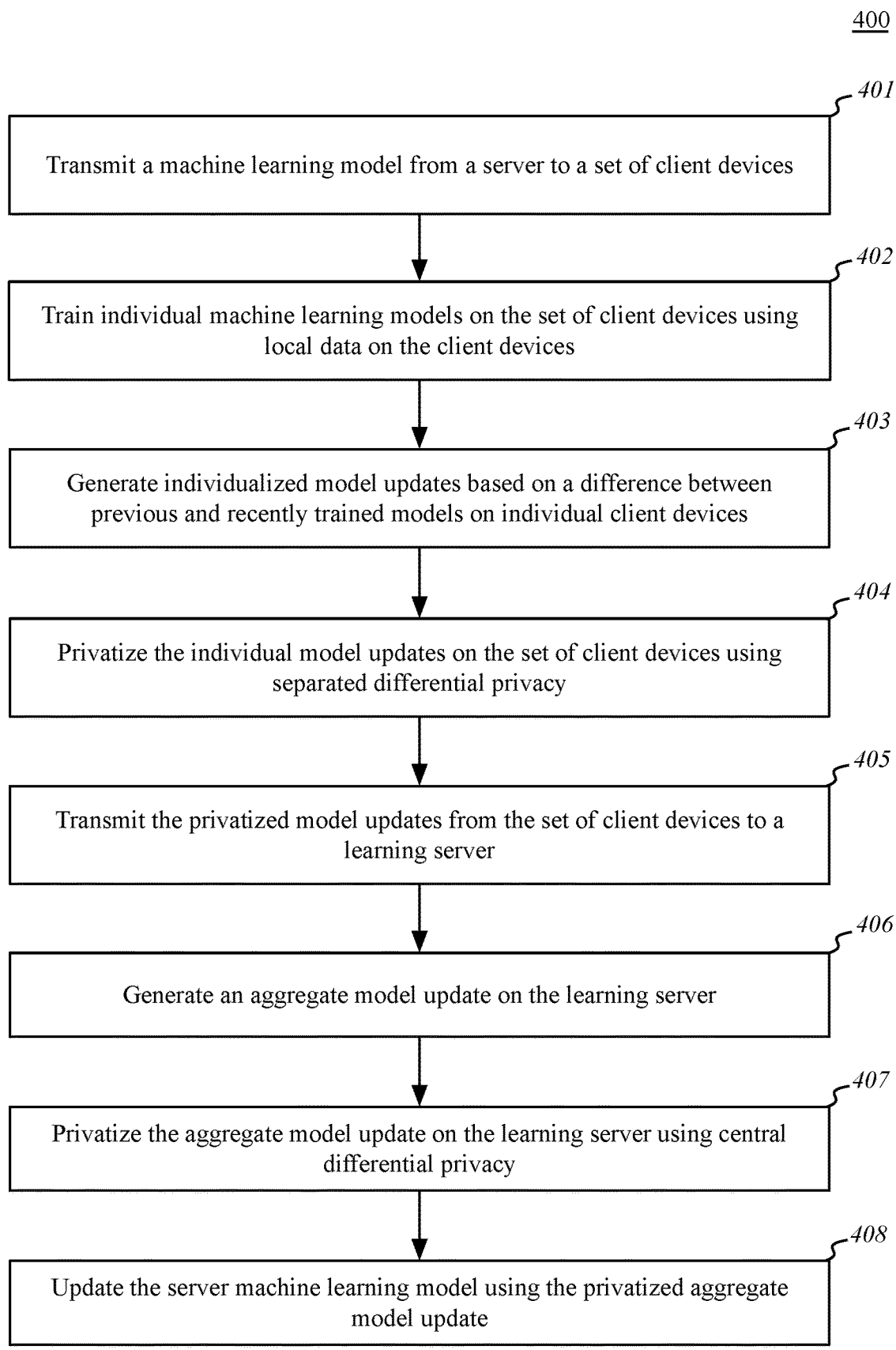
FIG. 4A is a flow diagram of a method of performing private federated learning using the computing components and privatization techniques described herein.

FIG. 4A is a flow diagram of a method 400 of performing private federated learning using the computing components and privatization techniques described herein. Operations of the method 400 will be described below, along with relevant mathematical descriptions of the operations to be performed. The method 400 includes operations (block 401) to transmit a machine learning model from a server to a set of client devices. Let $\theta \in \Theta$ be model parameters for a particular model that is to be trained using user data. The model parameters $\theta$ are transmitted to each device in a set of client devices. The server can be, for example, server 130 as described herein. The client devices can be, for example, client devices 110a-110n, 111a-111n, 112a-112n, client devices 210, or the client device 310 as described herein. Each client device then performs operations (block 402) to train an individual machine learning model using local data on the client device. For example, the locally trained model on device i becomes $\theta_i$ and the difference between the starting model parameters and the locally trained parameters $\Delta_i = \theta_i - \theta$ are determined. Individualized model updates can be generated based on an individualized difference between a previous model (e.g., starting model, previous model iteration, etc.) and a most recent locally trained model on the individual client devices (block 403). The individual model updates can then be privatized on the set of client devices using separated differential privacy (block 404). The privatized model updates are then sent from the set of client devices to a central learning server (block 405). A collection of b model differences $\{\Delta_1, \ldots, \Delta_b\}$ is then aggregated to obtain an aggregate model update $\Delta$ on the central server (block 406). The aggregate model update can then be used to update the central model parameters $\theta \leftarrow \theta + \Delta$. The update to the shared model can then be deployed to the client devices. These operations can continue in a loop continues as the model improves and user data changes. In one embodiment, central differential privacy techniques are used to protect the model updates on the server. Method 400 can additionally include to privatize the aggregate model updates on the learning server using central differential privacy (block 407). The privatized model updates can then be used to update the server machine learning model (block 408). Additional details are provided below for the operations of method 400.

Local privatization with separated differential privacy provides strong safeguards against reconstruction breaches from adversaries with some prior knowledge. Aggregate model privatization (block 407) is performed to prevent any one user from substantially impacting the overall server model with their local data, to prevent overfitting, and to enable privacy for server data. Aggregate model privatization is performed by incorporating central differential privacy into the separated differential privacy model used for model updates. Examples of private federated learning, techniques, mechanisms, and corresponding algorithms are provided in U.S. patent application Ser. No. 16/501,132 filed Jan. 17, 2020, entitled "Private Federated Learning with Protection Against Reconstruction," which is incorporated by reference herein in its entirety.

Figure 4B:
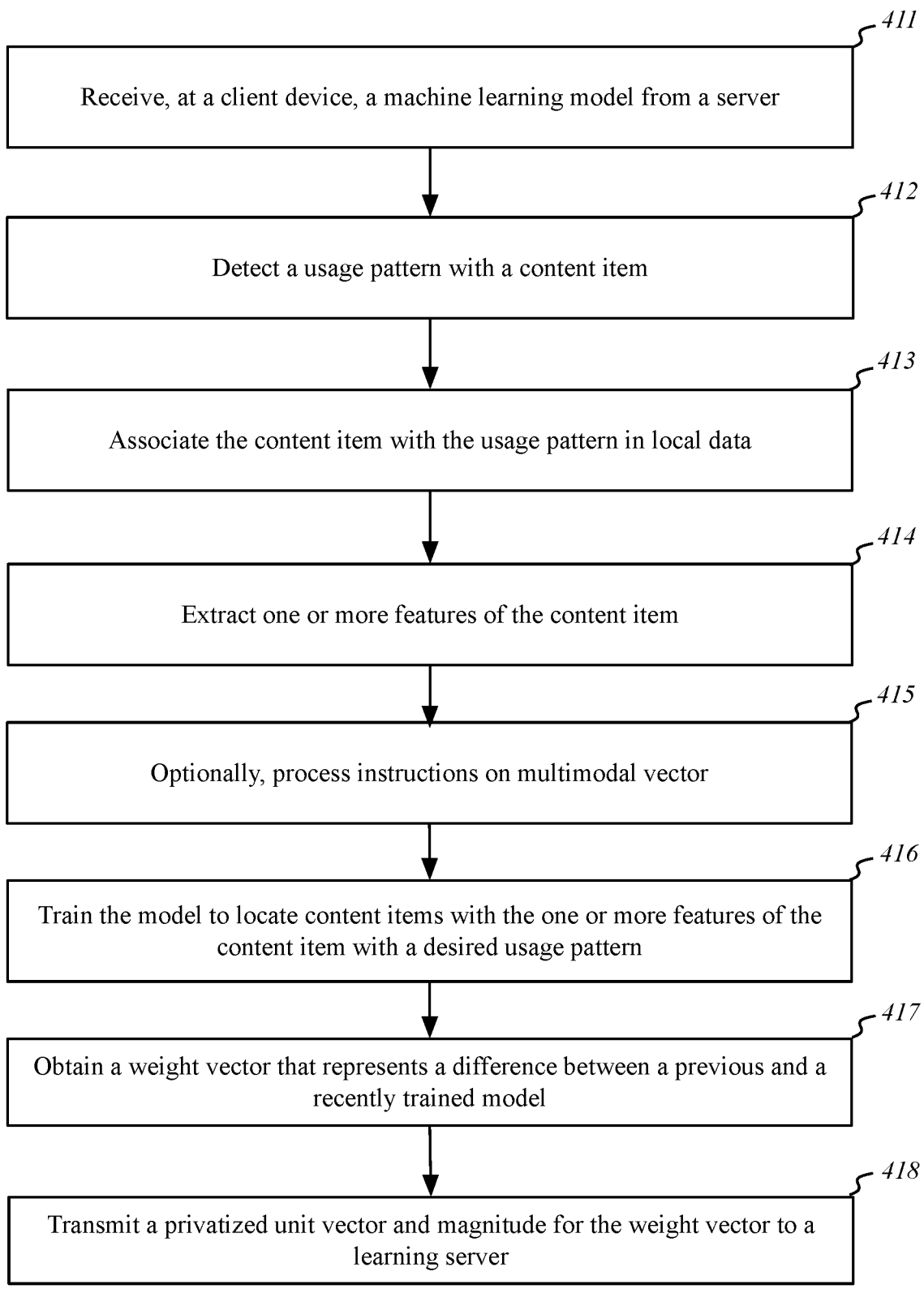
FIG. 4B is a flow diagram of a method to create a user behavior model described herein.

FIG. 4B is a flow diagram 410 of a method for performing private federated learning using the computing components and privatization techniques to create a user behavior model described herein. Initially, a machine learning model M0 131 may be received by client device 310 from a server 130 (411). The machine learning model M0 131 may be a previously trained model with privatized federated learning (e.g. a previously updated machine learning model M1 235) or an initial machine learning model. The initial machine learning model may be a model developed with sample training data that has not yet been used with on-device privatized federated learning.

Next, a usage pattern for a content item may be detected (412). The usage pattern is a series of one or more consecutive interactions in relation to access of the content item either detected by the client device 310 or detected by another device in communication with the client device 310. In a simple example, the content item (e.g., an image) may be accessed (e.g., displayed, rendered) within an application (e.g., a photo application) user interface executing on the client device 310, and the client device 310 may receive an input from an input controller indicating that the user selected the content item within a user interface (e.g., selected content item for a content item setting within a user interface, selected content item for editing, etc.) on the client device 310. Continuing with the example, the selection may be logged as an interaction for the content item on the client device 310 with relevant interaction information in interaction local data 374. The user may further interact with the content item by cropping the selected content item within a photo editor application and the two interactions and relevant interaction information may be stored in interaction local data 374. The set of the two interactions (e.g., identifiers for the interactions stored in local data) may be stored as a usage pattern in usage pattern local data 372 for the content item.

Information relevant to the interactions may be stored in local data 332, such as in interaction local data 374 and usage pattern local data 372 including, but not limited to, the following: a time of the interaction, a duration of time between interactions, a duration of time for the interaction, a time of day, a location of the user when interacting with the content item, any attention detection information (e.g., sensor data indicating user attention directed toward content item displayed) in relation to the client device 310 with a content item displayed on user interface the client device 310, a contact that received the content item, an indication for the quality of the interaction, a type of interaction, a count of similar interactions with the content item, a set of applications executing on trusted devices during interaction, a content item identifier, and/or any other data regarding the interaction.

In another example, the interaction may be detected by an accessory device of the client device 310 and/or another device that is part of a set of trusted devices for the user in communication with the client device 310. The set of trusted devices may have been authorized by an authenticated user to communicate data to the client device 310. Any form of credentials (e.g., username/password, passcode, biometric authentication) may be used to authenticate the user and allow the user to designate trusted devices. By way of further example, the user may interact with a first device (e.g., a smart watch, a wearable device) while the content item is displayed or accessed on a trusted companion device, such as the client device 310, and the interaction may be stored as a usage pattern local data 372 for the content item. Interactions that form the usage pattern for the content item may be detected with sensors, input controllers, and/or application programming interfaces of the application on one or more devices. Although a simple example may be used for ease of description, those with skill in the art will recognize that interactions with any of a set of user devices may be attributed to the access of the content item on the client device 310 and may form the usage pattern for the content item and/or related to access of the content item.

The usage pattern may be recorded and/or logged by client device 310 and stored in usage pattern local data 372. In some embodiments, interactions with the content item may be input received by the application (e.g., via an application programming interface) accessing the content item and displaying the content item on the user interface using an input controller for the client device 310, such as with a touch screen controller 842 and/or other input controller(s) 845. For example, the user may touch the content item on the display to select the content item within a curated album of images displayed on the user interface within a photo application executing on client device 310. In other embodiments, interactions may involve multiple applications. By way of example, the user may access the content item with a first application with a first interaction and select to send the content item in a communication (e.g., a text message) with a second application as a second interaction, and the set of interactions (e.g., set of interaction identifiers) may be stored as the usage pattern in usage pattern local data 372. Some embodiments may detect interactions from sensor data received at another device (e.g., heart rate monitor on smart watch, virtual assistant data collected at a smart home device, other media content played on speakers) when the content item is displayed on the client device 310. Such interactions may be logged as interactions related to the access of the content item and become part of the usage pattern for the content item.

The usage pattern may be associated with the content item in local data (413). In some embodiments, the content item may be annotated with an identifier that represents the usage pattern and the annotation of the content item may be stored in content item local data 366 and usage pattern local data 372. For example, an identifier for the usage pattern may be stored with an identifier for the content item in a table of a database in local data to capture the association. The usage pattern for the content item may be a feature of the content item and/or a desired usage pattern. If the usage pattern is not the desired usage pattern for training the machine learning model, the usage pattern is a feature that may be searched by the model to identify likely candidates that a user may select for the desired usage pattern. In other embodiments, all usage patterns received may be used to train the machine learning model M0 131, including usage patterns that do not have the exact desired usage pattern for training the machine learning model M0 131.

If the usage pattern is the desired usage pattern for training the machine learning model M0 131, then one or more features of the content item corresponding to the desired usage pattern in local data may be extracted (414) with a feature extractor 368. The desired usage pattern is the usage pattern representing the behavior of the user that the machine learning model is trained to predict and may contain at least one interaction common to the desired usage pattern. Features for the content item stored with the desired usage pattern are extracted from local data 332 to train the machine learning model M0 131.

The desired usage pattern may be hard-coded set of usage patterns for a specific set of interactions or a learned usage pattern that leads to a desired resulting interaction. For example, a user behavioral model for a usage pattern of selecting a content image to be rendered on the device (e.g., selected as a memory, selected for a slideshow, selected for a cover photo image of a photo album, selected as a screen saver, selected as a background image, selected as a profile photo, selected to represent an area of the home, selected as icon, etc.) for a device may be desired. As such, the usage pattern (e.g., set of interactions) logged prior to the selection of the content image to be rendered may aid in prediction of a particular content item for the desired usage pattern. In this way, the logged usage patterns prior to a desired usage pattern may be features of the content item that may be used for training the machine learning model.

In another embodiment, the desired usage pattern may be rendering content items over time (e.g., in a timeline) that are relevant to the user. For example, the user may render content items with audio prior to traveling to a known location (e.g., work) and/or during the weekend. In another example, the user may render content items of sunsets and/or family members when their usual routine of traveling to their known locations is altered (e.g., indicating vacation or work travel). In yet another example, the user may view content items with their partner prior to attending particular calendar events (e.g., attending wedding, graduation, etc.). The machine learning model may learn features of content items that are temporally relevant and/or contextually relevant during periods of time and the knowledge may aid in predicting future content items to display that are contextually and/or temporally relevant to the user.

The content item may have a vector of features stored for the content item in content item local data 366 that describe what is in the content or a class type for images (e.g., landscape type of image, contains a cat, nature, etc.). In some embodiments, the vector of features may be created with machine learning models, such as image classification. Other features may include scores or rankings that indicate the content item applicability for other tasks, such as a curation score. The curation score may indicate a number value for the suitability of an image to be in a curated album.

In some embodiments, the vector of features may be a multimodal vector of features including a set of values for features stored in local data. For example, the multimodal vector may have values for pixel embed local data, time data, and location data. The time data may indicate when the content item was taken, such as during the weekend. The location data may indicate a known location for the user such as a park, a work location, or any other frequent location for the user. Heuristics may be used to determine a frequented location for a user and associate the known location with the content item. Pixel embed data may provide information on a scene type for the image, e.g., such as a beach, a stream, etc.

In some embodiments, one or more preprocessing data, such as instructions and/or parameters, may be provided to the device (415). The preprocessing data may provide a set of instructions for both a set of operations and an order of operations to apply to the multimodal vector. In some embodiments, processing data, such as constant values, variable values, and/or operations (e.g., methods, functions, etc.), to perform on the multimodal vector may be provided on-the-fly or as needed from the server 130. In other embodiments, the preprocessing data may be previously stored on the device. By way of example, preprocessing data sent from the server to the client may be as follows:

```
{Feature version: v1.0 multimodal
  { Time : {
    Start_Index: 0,
    End_Index: 6,
    {Transformation_Order: [AddScalarToDimension(C=25)]
    }
  }
}.
```

As shown above, transformations (e.g., addition, multiplication, norm, division, etc.) may be performed on the multimodal vector to apply different weights to different features in order to predict the content items that the user may want for a desired usage pattern. In the example, a transformation of addition is performed on the time data. Those with skill in the art will recognize that different transformations can be applied to each feature in the vector to provide differing weight to features. In some embodiments, different instructions may be sent to client devices and a trial and error approach may be taken to determine the optimal set of instructions for preprocessing the vector data.

The machine learning model M0 131 may be trained to identify or predict one or more content items with features for a desired usage pattern (416). The one or more features (e.g., content item features and usage patterns associated with content items) gathered with the feature extractor 368 may be provided for training the machine learning model M0 131 to predict content items with similar features that the user may want to use for the desired usage pattern. For example, the desired usage pattern may be inclusion onto a schedule of content items (e.g., a timeline) that are rendered onto a user interface on the device. The feature extractor 368 may access one or more databases of local data to obtain the features for training the resulting updated machine learning model M1 235 to predict the desired usage pattern. A weight vector that represents a difference between the previously received machine learning model and a recently trained model is obtained (417), and the privatized unit vector and magnitude for the weight vector may be transmitted to the learning server (418), as described with FIGS. 5A-5B herein. Examples of private federated learning, learning techniques, and corresponding algorithms are provided in U.S. patent application Ser. No. 16/887,987 filed May 29, 2020, entitled "Private Federated Learning with Protection Against Reconstruction," and U.S. Provisional Patent Application No. 62/962,811 filed Jan. 17, 2020 entitled "Private Federated Learning with Protection Against Reconstruction," all of which are incorporated by reference herein in their entirety.

Figure 5A:
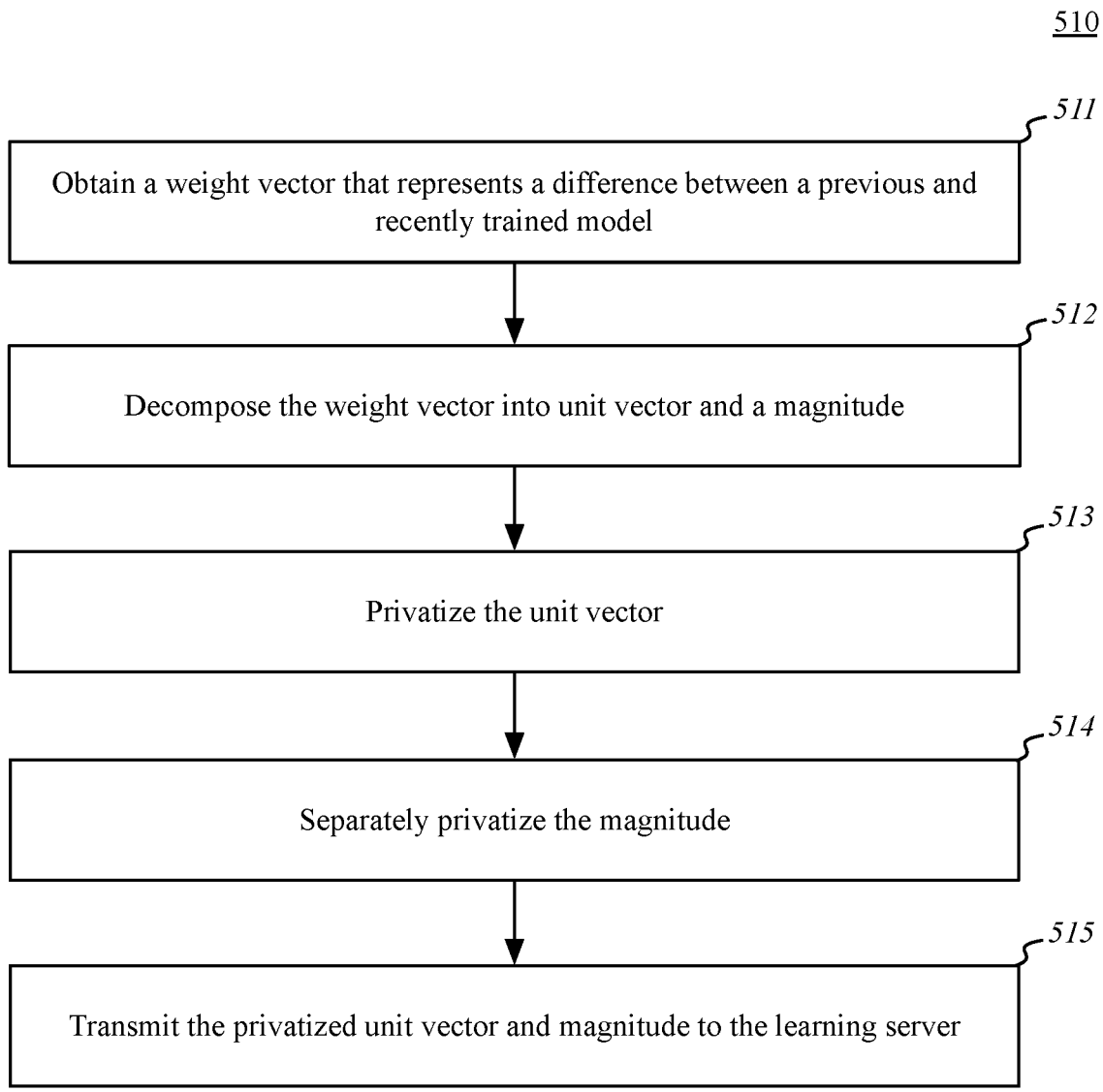
FIG. 5A illustrates techniques for privatizing model updates, according to an embodiment.

FIG. 5A illustrates a method 510 of privatizing model updates, according to an embodiment. Method 510 can be performed on a client device (e.g., client device 310) of the set of client devices selected to send a model update to a model update server (e.g., server 130). In one embodiment, method 510 includes an operation (block 511) to obtain a weight vector that represents a difference between a previous and recently trained model. This difference represents the model update that is to be transmitted to the learning server to update the current server model. Method 510 additionally includes an operation (block 512) to decompose the weight vector into a unit vector (e.g., unit direction $U=W/\|W\|_2$) and a magnitude (e.g., radius $R=\|W\|_2$). Method 500 additionally includes an operation (block 513) to privatize the unit vector. The unit vector can be privatized using any desired mechanism.

Method 510 additionally includes an operation (block 514) to separately privatize the magnitude. The magnitude can be privatized using any desired mechanism. The mechanism can be based on relative noise and will be privatized based on assumptions made about the availability of the data available to the attacker. The mechanism can also be a differentially private mechanism, which can be an absolute error-based mechanism or a relative error-based mechanism. Method 510 additionally includes an operation (block 515) to transmit the privatized unit vector and magnitude to the learning server as the model update. Examples of private federated learning techniques, mechanisms, and corresponding algorithms are provided in U.S. patent application Ser. No. 16/501,132 filed Jan. 17, 2020, entitled "Private Federated Learning with Protection Against Reconstruction," which is incorporated by reference herein in their entirety.

Figure 5B:
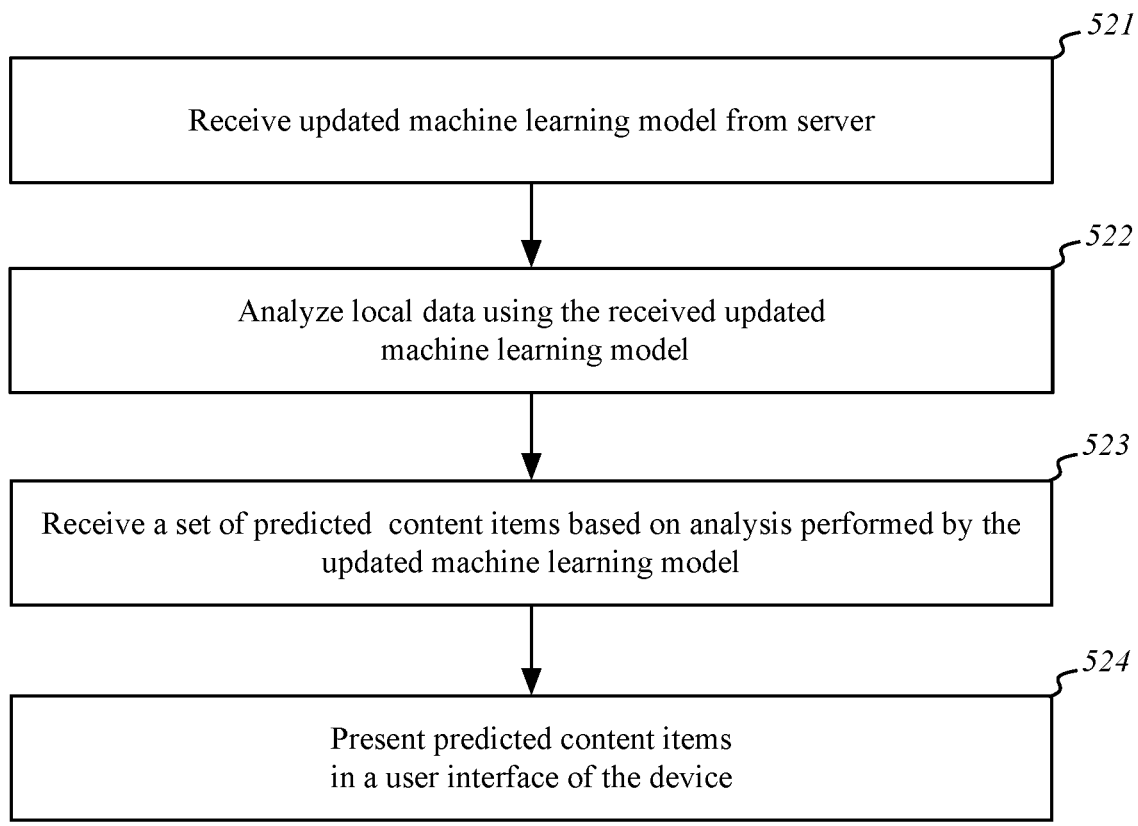
FIG. 5B is a flow diagram of a method for performing private federated learning using the computing components and privatization techniques to create a user behavior model described herein, according to embodiments.

FIG. 5B is a flow diagram 520 of a method for performing private federated learning using the computing components and privatization techniques to create a user behavior model described herein. The resulting updated machine learning model M1 235 created with aggregation of privatized model updates from one or more client devices of device groups 110, 111, and 112 is received at the client device 310 from the server 130 (521). In an embodiment, the received updated machine learning model M1 235 identifies a set of content items for the desired usage pattern of selecting the content item, such as a background image. The updated machine learning model M1 235 is used to analyze the local content data (e.g., content items) in local data 332 (522), such as content item local data 366, to identify a set of predicted content item selections (e.g., a screen saver, a background, an icon image, a profile photo for an account, a content item scheduled for rendering in a user interface, etc.) (523). The feature extractor 368 may gather local data associated with content items stored on the client device to identify content items with features (e.g., vector of features and/or usage patterns with content item), and the machine learning model M1 235 is used to identify content items similar to content items of interest for desired usage patterns in the past (e.g., selection for background image, selection of a content item within a user interface, selection of a content item scheduled to be rendered during a period of time, etc.). The predicted content items are presented in a user interface to the user of the device (524). In an embodiment, the predicted contents are content items relevant to a user during a period of time that may be scheduled for rendering on the client device 110.

Figure 6A:
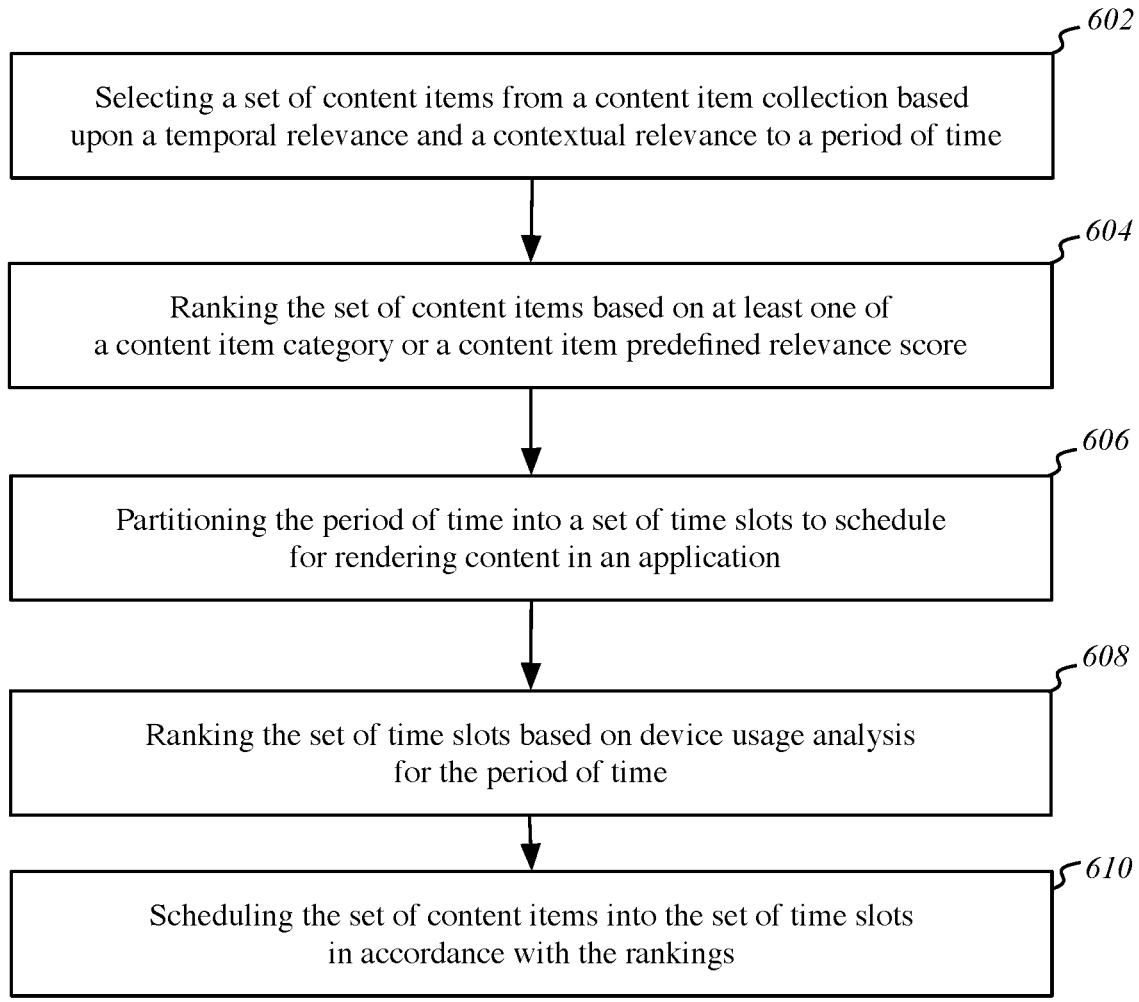
FIG. 6A is a flow diagram for timeline generation described herein, according to embodiments.

FIG. 6A is a flow diagram 600 of a method timeline generation described herein. Timeline generation may include generating a schedule for rendering of content items continuously throughout a period of time (e.g., a day, a week, a month, etc.). The intent is to predict content items that a user may be interested in and/or more likely to engage with during a period of time (e.g., predict content items and times during the day for rendering content items). The content items are scheduled in accordance with the relevance to a period of time for the user. In some embodiments, the period of time or a portion of the period of time may be repeatedly analyzed such that the schedule of content adjusts as user behavior model develops over time. By way of example, the timeline generation may be performed for a day and after the morning passes for the day, the timeline generation may be performed for the remainder of the day and the following day. In another example, the timeline may be generated at the beginning of each day. The content items selected may be recently collected content items and/or content items may be from the past relative to the period of time.

Initially, a set of content items from a content item collection may be selected based upon a temporal relevance and a contextual relevance to the period of time (602). A timeline generation user behavior model may provide predictions on a set content item from the content item collection (e.g., a photos collection in a photos application) that are relevant to user for the period of time (e.g., a day). The content items collection may be a library and/or a subset of content items stored for the user that the user has opted in to provide for timeline generation.

Predictions for content items to schedule and when to schedule the rendering of content items within the period of time may be provided with the user behavior model for timeline generation, in an embodiment. By way of example, the user behavior model for timeline generation may rely on one or more feature vectors, including, but not limited to, a temporal relevance vector and a contextual relevance vector to train the user behavior model used to identify the set of content items for scheduling within a timeline for the period of time.

The feature extractor 368 may be used to create multi-modal vectors to train the user behavior model to predict the set of content items relevant for the period of time (e.g., a particular day). The temporal relevance vector may include values for features that may be used to indicate a relevance to the period of time given the characteristics of the period of time. For example, a temporal relevance feature may be from local data 332 (e.g., pixel metadata, such as pixel embed local data 386) that indicates the relevance of the content item to characteristics of the period of time, such as a particular date, a month, a time of week, and/or a season. Continuing with the example, the local data 332 values on the content item included in the temporal relevance vector may indicate that the content item may have captured, recorded, shared, and/or previously accessed (e.g., interaction local data 374) on the same day or the same time of week in a prior year to the period of time. In another example, the temporal relevance feature values may indicate that a given content item corresponds better with the week prior to the period of time or the next week following the period of time, and the content item may be reserved for future scheduling.

Contextual relevant data may provide information on the circumstances and/or environment that the user may or may not be experiencing and/or will or will not be experiencing during the period of time. Contextual relevance vector may include values for features that are relevant to the context for the user during the period of time. For example, the contextual relevant local data 332 may include information such as system local data 390 on a planned trip to a location, a current location, and/or other data donated by applications on the system that may provide context for the user during the period of time. Continuing with the example, the contextual relevant features may be used to aid in longer term scheduling by reserving the rendering of content items at times when they are contextually relevant, such as when a user is in the location or planning to be in a location where the content items have been captured. Although an example is provided that relies on multimodal learning techniques, those with skill in the art will recognize that federated learning, neural nets, heuristics, and/or any other machine learning techniques may be used to determine the contextual and the temporal relevance of content items.

In some embodiments, content items are added to the set of content items based on an aesthetic relevance to the user during the period of time. Aesthetically relevant data may be any data that may indicate that a content item may be of interest or particularly appreciated by the user. Aesthetically relevant features may indicate subjectively high-quality assets from the content item collection, such as framing quality, subject matter, etc. For example, an aesthetic relevant feature vector that may be used by the user behavior model may include any local data, such as aesthetic local data 382, user activity data (e.g., information on content items shared, etc.), system local data 390, or any other data. The content items may be filtered to remove content items including taboo subject matter (e.g., not safe work content, images depicting blood, etc.), receipts, and/or work-related content (e.g., white board content items).

After the set of relevant content items are identified (e.g., using the timeline generation user behavior model), the set of content items may be ranked. The set of content items may be ranked based on at least one of a content item category or a content item predefined relevance score (604). Each content item from the set of content items may have a category and/or a predefined relevance score. In some embodiments, image classification techniques, neural networks, machine learning techniques, heuristics, and/or combination of techniques may be used to categorize or label content items with categories and/or provide a relevance score. In particular, image generators may be used to label images as likely belonging to a particular category for a memory or an event.

Categories may be event types, scene types, contain particular item type, and/or any other class of things that have shared characteristics (e.g., content item contains particular item (e.g., person) and/or captured at an event and/or scene). Categories are formed with algorithms using multiple signals (e.g., data stored on device, data stored on a server, a calendar with dates of significance in history, etc.) used to calculate the appropriate members of the category based on data accessible by the client device. Signals may further indicate people, location, and/or times in history associated with a content item that are designated as related to a particular category. In particular, signals gathered and used by an algorithm may indicate content items to designate as meaningful or featured for the user (e.g., particular vacation, etc.) and/or a larger population (e.g., election day, sporting event, etc.). Example categories further divided into tiers for analysis, include, but are not limited to, the following: Event Tier 1 (related to birthday), Event/Scene Tier 2 (related to trip, contain baby, contain pet, part of meaningful event collection of content items for user, related to a weekend, event type of holiday, event with people (such as a birthday or anniversary)), Scene Tier 3 (meaningful event for user, food, contains reoccurring trip location, contains social group, designated special event for user (e.g., attend sporting event), contains person, contains people visiting a location, contains place or region, contains neighbor, contains place, contains people, contains particular area), Event Tier 4 (designated as featured past event for user, related to event on calendar), Tier 5 (related to period of time of content items accessed over previous few weeks, location and people, related to business), Tier 6 (celebrated holiday in history, day in history, holiday in history), Tier 7 (designated as part of a year summary, designated as featured for a user, designated as related to a particular context), Tier 8 (recent event, upcoming event, celebrated over time, contains designated key people for user at an upcoming holiday or event), Tier 9 (early moments in time captured with people, contain particular people over time, season in history, home aggregation, designated for throwback Thursday), and Tier 10 (contains location and/or person nearby: today, last weekend, last week, same day, and/or same weekend, captured during important week in history(e.g., election week), designated as best of past, captured last season). The predefined relevance score may be a combined score depending on the number of tiers that the content item belongs in.

By way of example, the ranking score may be determined as follows:

Rank=(0.70×best category tier score)+(0.30×predetermined relevance score)

After the set of content items are ranked, the period of time may be partitioned into a set of time slots to schedule for rendering content in an application (606).

Figure 6B:
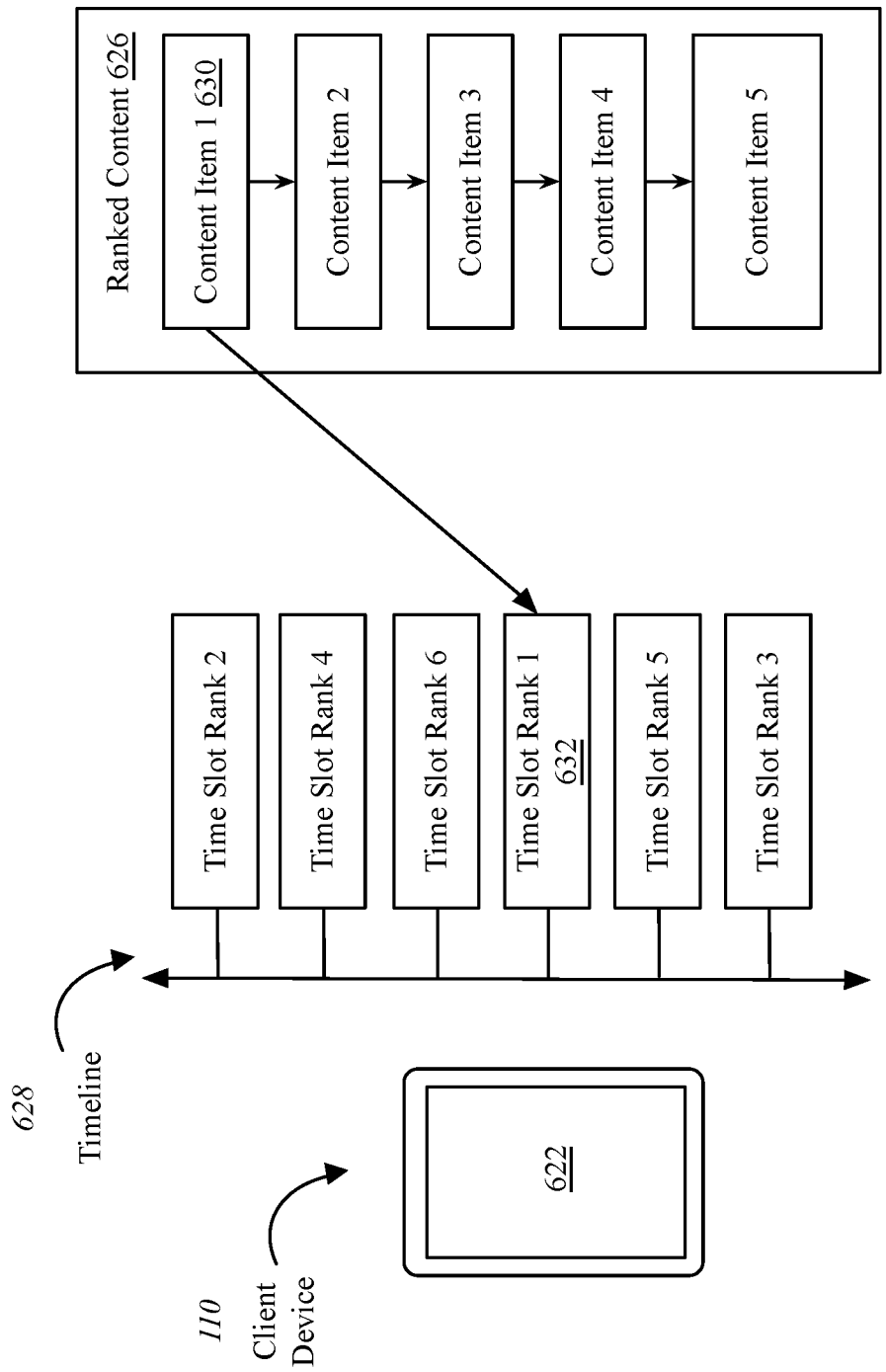
FIG. 6B is a block diagram for timeline generation described herein, according to embodiments.

FIG. 6B is a block diagram 620 for timeline generation illustrating the division of the period of time (e.g., a day) partitioned into time slot within the timeline 628. The time slots for the period of time may be a subset of the timeline scheduling. The timeline provides a schedule for continuous rendering of content items on client device 110 within one or more applications 622 executing on the device. In some embodiments, a record of content items that have been accessed and/or displayed is stored and used to avoid collisions (e.g., not show the same photo within a period of time). In this way, each content item may have a life cycle for display within a timeline.

Next, the set of time slots may be ranked based on device usage analysis for the period of time (608). The device usage analysis may provide information on preferences of particular times for a user device activity type (e.g., interacting with content items). The user device activity type may be interactions by the user with rendered content in the application 622, such as interactions with content items in a Photos application. By way of example, user device activity analysis may indicate that a user interacts with content items in a photos application at particular times of a day more often than at other times, such as before work, after work, and during lunch and the time slot may be ranked to indicate this preference. In another example, user device analysis may indicate that a user does not interact with photos of an event immediately following the occurrence event (e.g., a birthday). The goal of the user analysis is to determine the right time to render content for the user based on prior interactions with types of content items by the user.

The set of content items may be scheduled into the set of time slots in accordance with the rankings (610). The ranked content 626 may be assigned in order to the highest available time slot rank in the timeline 628, as shown with 630 assignment to 632, until the timeline is scheduled with the ranked content.

Figure 7:
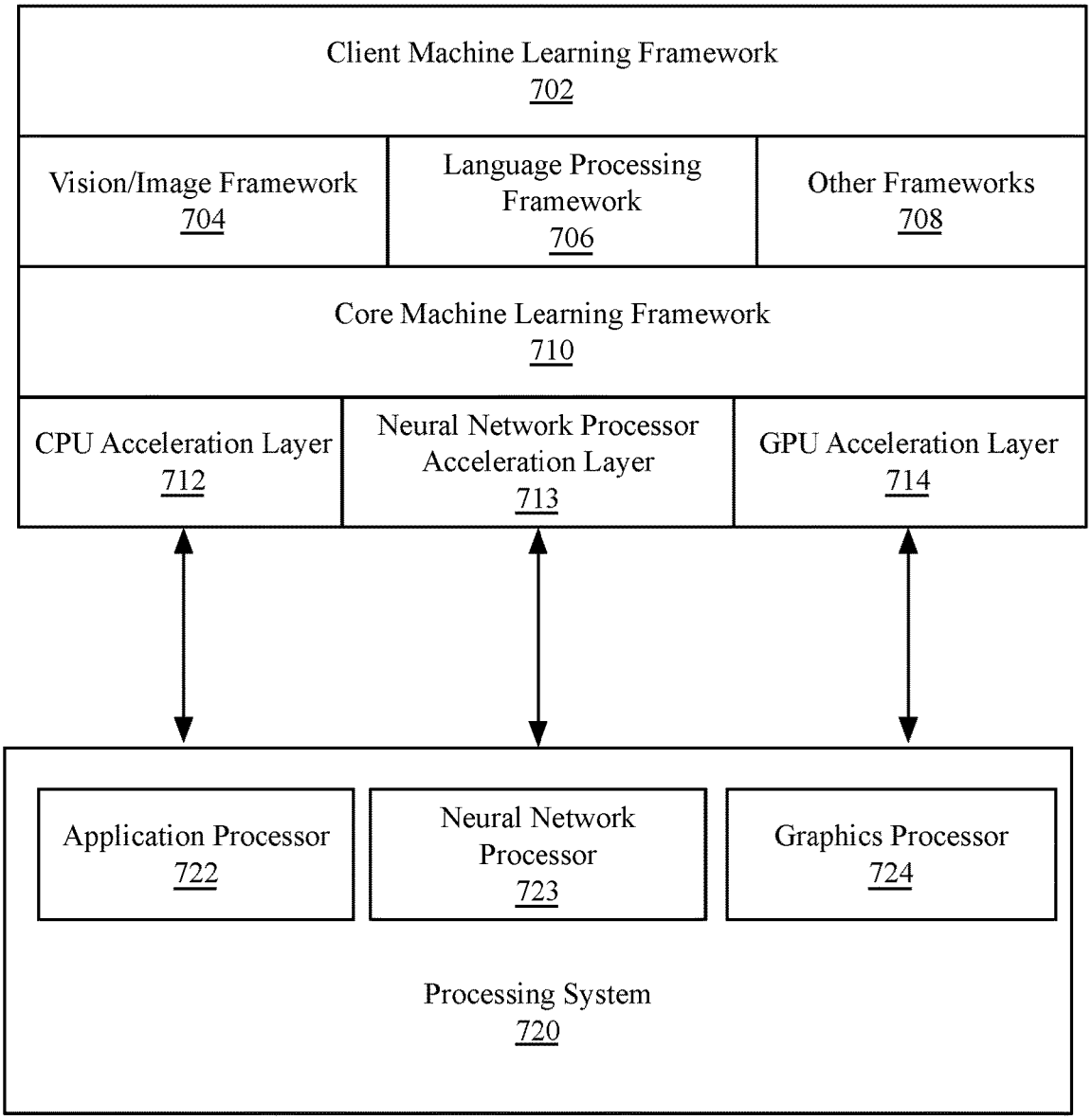
FIG. 7 illustrates compute architecture on a client device that can be used to enable on-device training using machine learning algorithms, according to embodiments described herein.

FIG. 7 illustrates compute architecture 700 on a client device that can be used to enable on-device training using machine learning algorithms, according to embodiments described herein. In one embodiment, compute architecture 700 includes a client machine learning framework 702 that can be configured to leverage a processing system 720 on a client device. The client machine learning framework 702 includes a vision/image framework 704, a language processing framework 706, and one or more other frameworks 708, which each can reference primitives provided by a core machine learning framework 710. The core machine learning framework 710 can access resources provided via a CPU acceleration layer 712, neural network processor acceleration layer 713 and a GPU acceleration layer 714. The CPU acceleration layer 712, neural network processor acceleration layer 713, and the GPU acceleration layer 714 each facilitate access to a processing system 720 on the various client devices described herein.

The processing system includes an application processor 722, a neural network processor 723, and a graphics processor 724, each of which can be used to accelerate operations of the core machine learning framework 710 and the various higher-level frameworks that operate via primitives provided via the core machine learning framework. The application processor 722 and graphics processor 724 include hardware that can be used to perform general-purpose processing and graphics specific processing for the core machine learning framework 710. The neural network processor 723 includes hardware that is tuned specifically to accelerate processing operations for artificial neural networks. The neural network processor 723 can increase speed at which neural network operations are performed but is not required to enable the operation of the client machine learning framework 702. For example, training can also be performed using the application processor 722 and/or the graphics processor 724.

In one embodiment, the various frameworks and hardware resources of the compute architecture 700 can be used for inferencing operations as well as training operations. For example, a client device can use the compute architecture 700 to perform supervised learning via a machine learning model as described herein, such as but not limited to a CNN, RNN, or LSTM model. The client device can then use the trained machine learning model to perform classification operations for one or a variety of predictive models including but not limited to a natural language processing model, a predictive text model, an application suggestion model, and application activity suggestion model, a voice classification model, and an image classification model.

Figure 8:
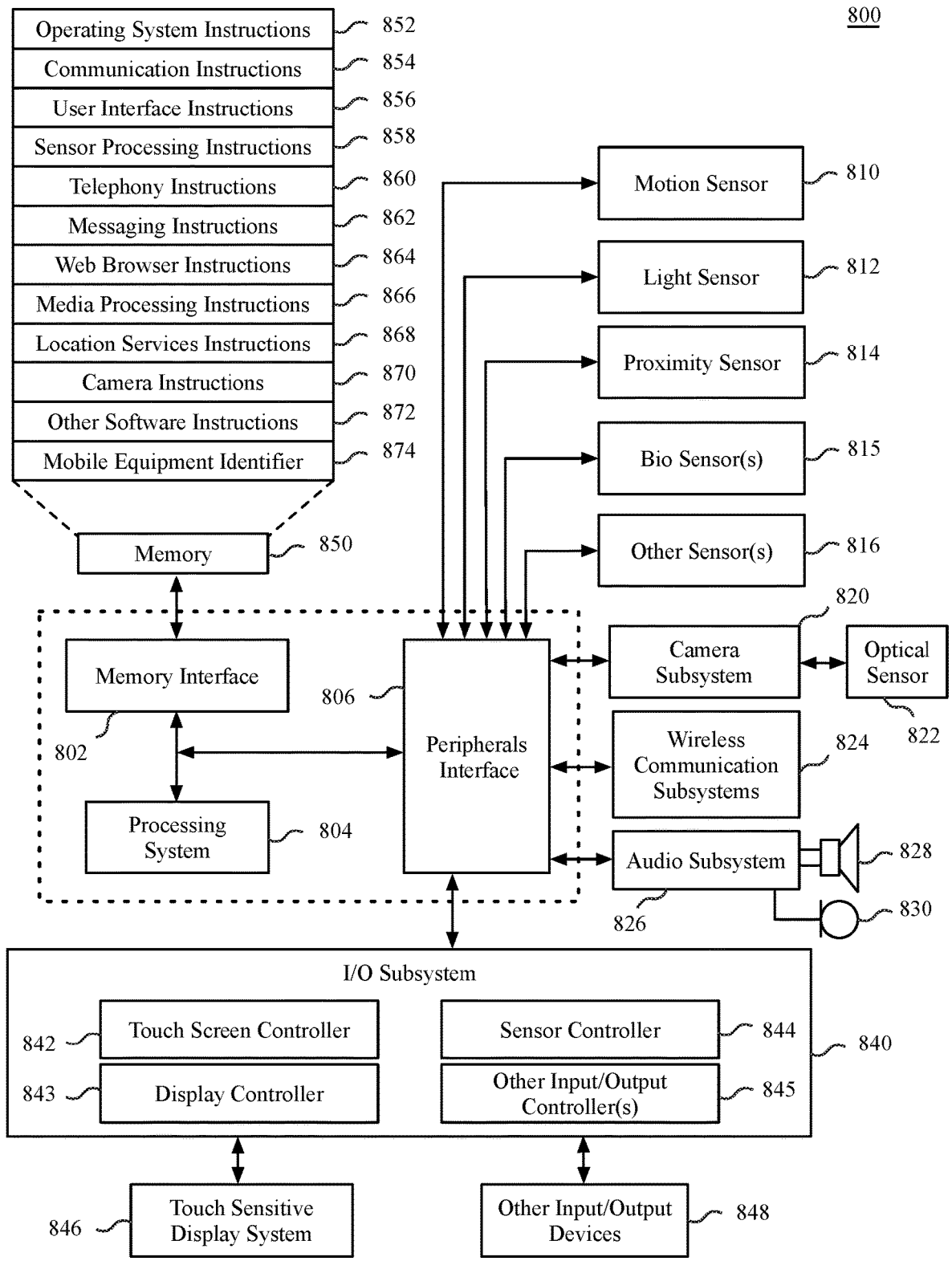
FIG. 8 is a block diagram of a device architecture for a mobile or embedded device, according to an embodiment.

FIG. 8 is a block diagram of a device architecture 800 for a mobile or embedded device, according to an embodiment. The device architecture 800 includes a memory interface 802, a processing system 804 including one or more data processors, image processors and/or graphics processing units, and a peripherals interface 806. The various components can be coupled by one or more communication buses or signal lines. The various components can be separate logical components or devices or can be integrated in one or more integrated circuits, such as in a system on a chip integrated circuit.

The memory interface 802 can be coupled to memory 850, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate the mobile device functionality. One or more biometric sensor(s) 815 may also be present, such as a fingerprint scanner for fingerprint recognition or an image sensor for facial recognition. Other sensors 816 can also be connected to the peripherals interface 806, such as a positioning system (e.g., GPS receiver), a temperature sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated device architecture 800 can include wireless communication subsystems 824 designed to operate over a GSM network, a CDMA network, an LTE network, a Wi-Fi network, a Bluetooth network, or any other wireless network. In particular, the wireless communication subsystems 824 can provide a communications mechanism over which a media playback application can retrieve resources from a remote media server or scheduled events from a remote calendar or event server.

An audio subsystem 826 can be coupled to a speaker 828 and a microphone 830 to facilitate voice-enabled functions, such as voice recognition, voice replication, digital recording, and telephony functions. In smart media devices described herein, the audio subsystem 826 can be a high-quality audio system including support for virtual surround sound.

The I/O subsystem 840 can include a touch screen controller 842 and/or other input controller(s) 845. For computing devices including a display device, the touch screen controller 842 can be coupled to a touch sensitive display system 846 (e.g., touch-screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
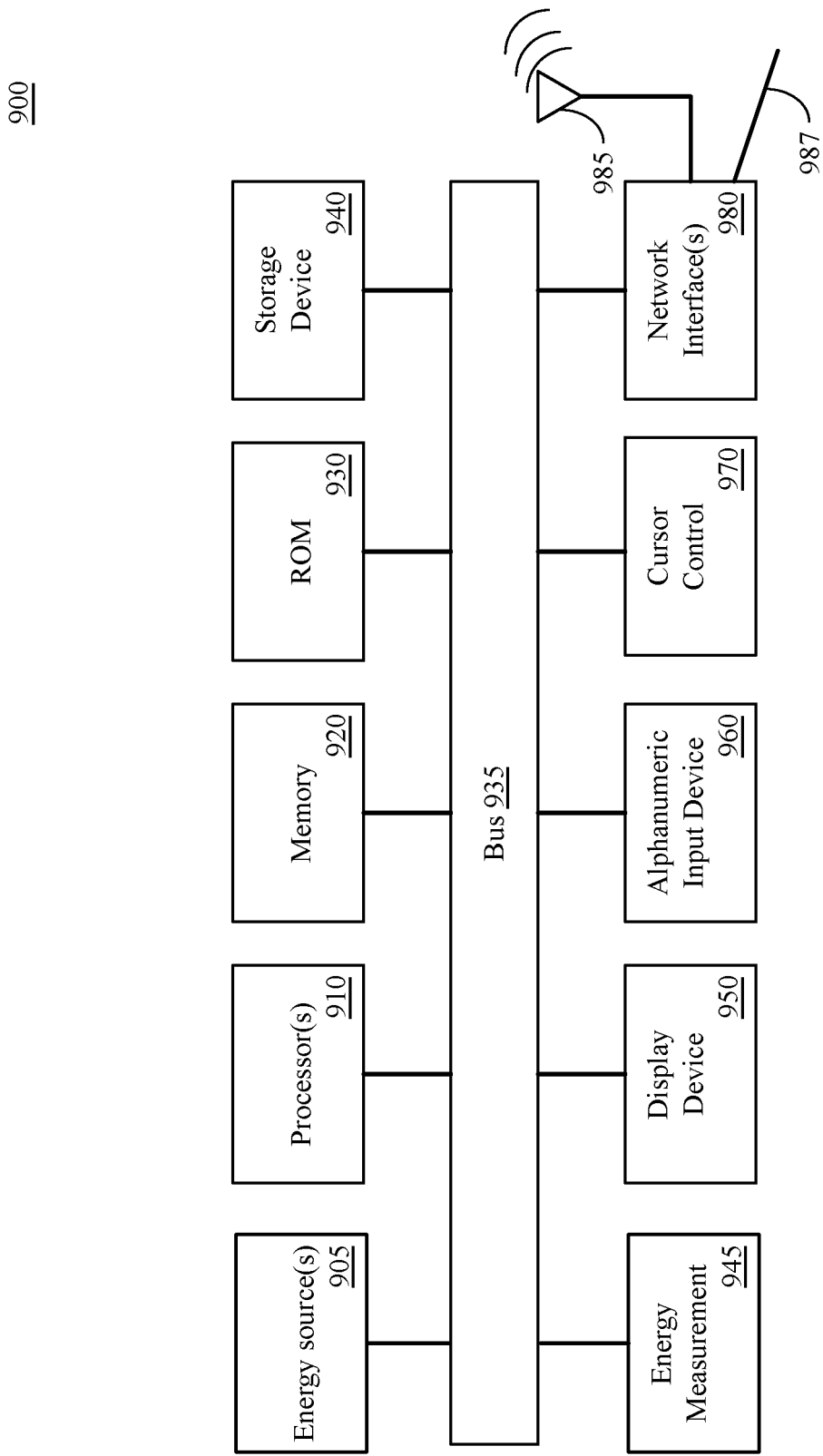
FIG. 9 is a block diagram of a computing system, according to an embodiment.

FIG. 9 is a block diagram of a computing system 900, according to an embodiment. The illustrated computing system 900 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 900 can be used to provide the computing device and/or a server device to which the computing device may connect.

The computing system 900 includes bus 935 or other communication device to communicate information, and processor(s) 910 coupled to bus 935 that may process information. While the computing system 900 is illustrated with a single processor, the computing system 900 may include multiple processors and/or co-processors. The computing system 900 further may include memory 920, such as random-access memory (RAM) or other dynamic storage device coupled to the bus 935. The memory 920 may store information and instructions that may be executed by processor(s) 910. The memory 920 may also be used to store temporary variables or other intermediate information during execution of instructions by the processor(s) 910.

The computing system 900 may also include read only memory (ROM) 930 and/or another data storage device 940 coupled to the bus 935 that may store information and instructions for the processor(s) 910. The data storage device 940 can be or include a variety of storage devices, such as a flash memory device, a magnetic disk, or an optical disc and may be coupled to computing system 900 via the bus 935 or via a remote peripheral interface.

The computing system 900 may also be coupled, via the bus 935, to a display device 950 to display information to a user. The computing system 900 can also include an alphanumeric input device 960, including alphanumeric and other keys, which may be coupled to bus 935 to communicate information and command selections to processor(s) 910. Another type of user input device includes a cursor control 970 device, such as a touchpad, a mouse, a trackball, or cursor direction keys to communicate direction information and command selections to processor(s) 910 and to control cursor movement on the display device 950. The computing system 900 may also receive user input from a remote device that is communicatively coupled via one or more network interface(s) 980.

The computing system 900 further may include one or more network interface(s) 980 to provide access to a network, such as a local area network. The network interface(s) 980 may include, for example, a wireless network interface having antenna 985, which may represent one or more antenna(e). The computing system 900 can include multiple wireless network interfaces such as a combination of Wi-Fi, Bluetooth®, near field communication (NFC), and/or cellular telephony interfaces. The network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, the network interface(s) 980 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 900 can further include one or more energy sources 905 and one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing system 900 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the hardware can use an instruction set which may be an extension to an instruction set architecture for a particular type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

As described above, one aspect of the present technology is the gathering and use of data available from various specific and legitimate sources to enable on-device analysis of local user data and crowdsourced learning of sequential data. The present disclosure contemplates that in some instances, this gathered data may include personal information data that uniquely identifies or can be used to identify a specific person. Such personal information data can include demographic data, location-based data, online identifiers, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to schedule content to be rendered in a user interface, learn new words, improve keyboard layouts, improve auto-correct engines for keyboards, and to enable an electronic device to better anticipate the needs of a user. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, crowdsourcing of sequences can be performed over a large number of users and is based on aggregated, non-personal information data. A large number of individual users can opt out of sending data to the sequence learning server and overall trends can still be detected.

In the foregoing description, example embodiments of a private federated learning system have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment described herein provides for a non-transitory machine-readable medium storing instructions to cause one or more processors of a data processing system to perform operations comprising receiving, at a client device, a machine learning model from a server, detecting a usage pattern for a content item, the detected usage pattern comprising at least one interaction in relation to the content item, storing an association between the content item and the detected usage pattern in local data, the local data comprising at least one association between the content item and a content item feature, training, at the client device, the machine learning model using local data for the content item with the detected usage pattern to generate a trained machine learning model, the trained machine learning model to identify a predicted content item with one or more identified content item features for a desired usage pattern, generating an update for the machine learning model, the update that represents a difference between the machine learning model and the trained machine learning model, privatizing the update for the machine learning model, and transmitting the privatized update for the machine learning model to the server.

One embodiment described herein provides for a data processing system comprising a memory to store instructions and one or more processors to execute the instructions. The instructions cause the one or more processors to receive, at a client device, a machine learning model from a server, detect a usage pattern for a content item, the detected usage pattern comprising at least one interaction in relation to the content item, store an association between the content item and the detected usage pattern in local data, the local data comprising at least one association between the content item and a content item feature, train, at the client device, the machine learning model using local data for the content item with the detected usage pattern to generate a trained machine learning model, the trained machine learning model to identify a predicted content item with one or more identified content item features for a desired usage pattern, generate an update for the machine learning model, the update that represents a difference between the machine learning model and the trained machine learning model, privatize the update for the machine learning model, and transmit the privatized update for the machine learning model to the server.

One embodiment described herein provides for a method comprising receiving, at a client device, a machine learning model from a server, detecting a usage pattern for a content item, the detected usage pattern comprising at least one interaction in relation to the content item, storing an association between the content item and the detected usage pattern in local data, the local data comprising at least one association between the content item and a content item feature, training, at the client device, the machine learning model using local data for the content item with the detected usage pattern to generate a trained machine learning model, the trained machine learning model to identify a predicted content item with one or more identified content item features for a desired usage pattern, generating an update for the machine learning model, the update that represents a difference between the machine learning model and the trained machine learning model, privatizing the update for the machine learning model, and transmitting the privatized update for the machine learning model to the server.

One embodiment described herein provides for a non-transitory machine-readable medium storing instructions to cause one or more processors of a data processing system to perform operations comprising selecting a set of content items from a content item collection based upon a temporal relevance and a contextual relevance to a period of time, ranking the set of content items based on at least one of a content item category or a content item predefined relevance score, partitioning the period of time into a set of time slots to schedule for rendering content in an application, ranking the set of time slots based on device usage analysis for the period of time, the device usage analysis comprising information on preferences for a user device activity type, and the user device activity type comprising interactions with rendered content, and scheduling the set of content items into the set of time slots in accordance with the rankings.

One embodiment described herein provides for a data processing system comprising a memory to store instructions and one or more processors to execute the instructions. The instructions cause the one or more processors to select a set of content items from a content item collection based upon a temporal relevance and a contextual relevance to a period of time, rank the set of content items based on at least one of a content item category or a content item predefined relevance score, partition the period of time into a set of time slots to schedule for rendering content in an application, rank the set of time slots based on device usage analysis for the period of time, the device usage analysis comprising information on preferences for a user device activity type, and the user device activity type comprising interactions with rendered content, and schedule the set of content items into the set of time slots in accordance with the rankings.

One embodiment described herein provides for a method comprising selecting a set of content items from a content item collection based upon a temporal relevance and a contextual relevance to a period of time, ranking the set of content items based on at least one of a content item category or a content item predefined relevance score, partitioning the period of time into a set of time slots to schedule for rendering content in an application, ranking the set of time slots based on device usage analysis for the period of time, the device usage analysis comprising information on preferences for a user device activity type, and the user device activity type comprising interactions with rendered content, and scheduling the set of content items into the set of time slots in accordance with the rankings.

In the embodiments described herein, local model updates generated by user devices are privatized using mechanisms that can be shown to be sufficient to guarantee strong reconstruction protections for high-dimensional data for a large range of $\varepsilon$, $\rho$ parameters when the adversary knows relatively little a priori about the actual input. The various privacy mechanisms described herein can be employed without reducing the utility of the data for learning operations.

In some embodiments, separated differential privacy mechanisms are employed. The separated differential privacy mechanisms can decompose a model update into a unit vector and magnitude, then separately privatize the unit vector and magnitude for each update to the machine learning model before the update is transmitted by the user device.

The machine learning models described herein can be used in a variety of applications, including natural language processing, image classification, or voice classification. After a model is updated using aggregated model updates, the updated model, or the simply the updates to the model, can be re-transmitted to the client devices for further training and updates.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A non-transitory machine-readable medium storing instructions to cause one or more processors of a data processing system to perform operations comprising:
   receiving, at a client device, a machine learning model from a server;
   detecting a usage pattern for a content item, the detected usage pattern comprising at least one interaction in relation to the content item;

storing an association between the content item and the detected usage pattern in local data, the local data comprising at least one association between the content item and a content item feature;

training, at the client device, the machine learning model using local data for the content item with the detected usage pattern to generate a trained machine learning model, the trained machine learning model to identify a predicted content item with one or more identified content item features for a desired usage pattern;

generating an update for the machine learning model, the update that represents a difference between the machine learning model and the trained machine learning model;

privatizing the update for the machine learning model; and transmitting the privatized update for the machine learning model to the server.

2. The non-transitory machine-readable medium as in claim 1, wherein the association comprises annotating the content item with the usage pattern.

3. The non-transitory machine-readable medium as in claim 1, wherein the desired usage pattern is a hard-coded set of interactions with the content item.

4. The non-transitory machine-readable medium as in claim 1, wherein the desired usage pattern is a learned sequence of interactions from local interaction data.

5. The non-transitory machine-readable medium as in claim 1, wherein the desired usage pattern is a series of interactions prior to selection of a content item for a content item setting of an application.

6. The non-transitory machine-readable medium as in claim 1, wherein the content item is an image.

7. The non-transitory machine-readable medium as in claim 1, the one or more identified content item features is a multimodal vector of features.

8. A data processing system comprising:
a memory to store instructions;
one or more processors to execute the instructions, wherein the instructions cause the one or more processors to:
receiving, at a client device, a machine learning model from a server;
detecting a usage pattern for a content item, the detected usage pattern comprising at least one interaction in relation to the content item;
storing an association between the content item and the detected usage pattern in local data, the local data comprising at least one association between the content item and a content item feature;
training, at the client device, the machine learning model using local data for the content item with the detected usage pattern to generate a trained machine learning model, the trained machine learning model to identify a predicted content item with one or more identified content item features for a desired usage pattern;
generating an update for the machine learning model, the update that represents a difference between the machine learning model and the trained machine learning model;
privatizing the update for the machine learning model; and
transmitting the privatized update for the machine learning model to the server.

9. The data processing system as in claim 8, wherein the association comprises annotating the content item with the usage pattern.

10. The data processing system as in claim 8, wherein the desired usage pattern is a hard-coded set of interactions with the content item.

11. The data processing system as in claim 8, wherein the desired usage pattern is a learned sequence of interactions from local interaction data.

12. The data processing system as in claim 8, wherein the desired usage pattern is a series of interactions prior to selection of a content item for a content item setting of an application.

13. The data processing system as in claim 8, wherein the content item is an image.

14. A method comprising:
receiving, at a client device, a machine learning model from a server;
detecting a usage pattern for a content item, the detected usage pattern comprising at least one interaction in relation to the content item;
storing an association between the content item and the detected usage pattern in local data, the local data comprising at least one association between the content item and a content item feature;
training, at the client device, the machine learning model using local data for the content item with the detected usage pattern to generate a trained machine learning model, the trained machine learning model to identify a predicted content item with one or more identified content item features for a desired usage pattern;
generating an update for the machine learning model, the update that represents a difference between the machine learning model and the trained machine learning model;
privatizing the update for the machine learning model; and
transmitting the privatized update for the machine learning model to the server.

15. The method of claim 14, wherein the association comprises annotating the content item with the usage pattern.

16. The method of claim 14, wherein the desired usage pattern is a hard-coded set of interactions with the content item.

17. The method of claim 14, wherein the desired usage pattern is a learned sequence of interactions from local interaction data.

18. The method of claim 14, wherein the desired usage pattern is a series of interactions prior to selection of a content item for a content item setting of an application.

19. The method of claim 14, the one or more identified content item features is a multimodal vector of features.

* * * * *